(12) United States Patent
Kuncinger

(10) Patent No.: US 10,703,919 B2
(45) Date of Patent: Jul. 7, 2020

(54) BROKEN DISPERSION FOR HYDROPHOBICIZING LIGNOCELLULOSE-CONTAINING MATERIAL

(71) Applicant: Fritz Egger GmbH & Co. OG, St. Johann in Tirol (AT)

(72) Inventor: Thomas Kuncinger, Vienna (AT)

(73) Assignee: Fritz Egger GmbH & Co. OG, St. Johann In Tirol (AT)

(*) Notice: Subject to any disclaimer, the term of this patent is extended or adjusted under 35 U.S.C. 154(b) by 0 days.

(21) Appl. No.: 15/307,252

(22) PCT Filed: Jul. 5, 2016

(86) PCT No.: PCT/EP2016/065854
§ 371 (c)(1),
(2) Date: Apr. 17, 2017

(87) PCT Pub. No.: WO2017/029016
PCT Pub. Date: Feb. 23, 2017

(65) Prior Publication Data
US 2017/0306165 A1    Oct. 26, 2017

(30) Foreign Application Priority Data
Aug. 19, 2015  (DE) .......... 10 2015 113 775

(51) Int. Cl.
C09D 5/02      (2006.01)
C09D 15/00     (2006.01)
(Continued)

(52) U.S. Cl.
CPC .............. *C09D 5/027* (2013.01); *B27K 3/005* (2013.01); *B27K 3/0278* (2013.01); *B27K 3/15* (2013.01);
(Continued)

(58) Field of Classification Search
CPC ...... C09D 5/027; C09D 15/00; C09D 191/06; B27K 3/34; B27K 3/50; B27K 3/005;
(Continued)

(56) References Cited

U.S. PATENT DOCUMENTS 4,472,230 A * 9/1984 Sachs ................... C08G 18/706
                                              156/307.3
5,098,605 A    3/1992 Buriks et al.
(Continued)

FOREIGN PATENT DOCUMENTS

DE    40 40 740 A1    6/1991
DE    195 46 073 A1   6/1997
(Continued)

OTHER PUBLICATIONS

PCT International Search Report, PCT/EP2016/065854, dated Sep. 15, 2016 (4 pages).

*Primary Examiner* — Philip C Tucker
*Assistant Examiner* — Vicki Wu
(74) *Attorney, Agent, or Firm* — Honigman LLP; Jonathan P. O'Brien

(57) ABSTRACT

The invention relates to a process for forming a wood-base product comprising the steps of a) providing particles of wood, b) resinating the particles of wood with a binder, c) compressing the resinated particles of wood to form a wood-base product, wherein before, during or after step b) the particles of wood and/or the binder are brought into contact with a broken dispersion. The invention also relates to the use of a polyfunctional compound as demulsifier for breaking a wax-containing dispersion. The invention further relates to a broken dispersion for hydrophobicizing lignocellulose-containing material. The invention additionally relates to a two-component system containing at least two components A and B: a wax-containing dispersion A) and a (Continued)

demulsifier B) having at least one functional group for breaking the wax-containing dispersion.

13 Claims, 11 Drawing Sheets

(51) Int. Cl.
    *B27N 7/00*     (2006.01)
    *B27K 3/50*     (2006.01)
    *B27N 3/02*     (2006.01)
    *B27N 1/02*     (2006.01)
    *C09D 191/06*     (2006.01)
    *C08L 97/02*     (2006.01)
    *B27K 3/34*     (2006.01)
    *B27K 3/15*     (2006.01)
    *B27K 3/02*     (2006.01)
    *B27K 3/00*     (2006.01)
    *B27K 5/00*     (2006.01)

(52) U.S. Cl.
    CPC ............ *B27K 3/34* (2013.01); *B27K 3/50* (2013.01); *B27K 5/001* (2013.01); *B27K 5/007* (2013.01); *B27N 1/0209* (2013.01); *B27N 3/02* (2013.01); *B27N 7/005* (2013.01); *C08L 97/02* (2013.01); *C09D 15/00* (2013.01); *C09D 191/06* (2013.01); *B27K 2200/10* (2013.01); *B27K 2240/70* (2013.01)

(58) Field of Classification Search
    CPC ........ B27K 3/0278; B27K 3/15; B27K 5/001; B27K 5/007; B27K 2240/70; B27K 2200/10; B27N 1/0209; B27N 3/02; B27N 7/005; C08L 97/02

USPC .......................................................... 264/109
See application file for complete search history.

(56) References Cited

U.S. PATENT DOCUMENTS

| | | |
|---|---|---|
| 5,743,949 A | 4/1998 | Kainz |
| 5,865,882 A | 2/1999 | Lowe |
| 6,352,661 B1 * | 3/2002 | Thompson ........... C08G 18/708 156/62.2 |
| 2006/0264519 A1 * | 11/2006 | Eckert .................... B27N 1/00 516/41 |
| 2007/0059509 A1 * | 3/2007 | Racota .................... B05D 7/06 428/292.4 |
| 2007/0181035 A1 * | 8/2007 | Wantling ............... B27N 1/006 106/270 |
| 2008/0153931 A1 | 6/2008 | Bruchmann et al. |
| 2010/0022687 A1 * | 1/2010 | Rowland ................. B27N 3/00 524/35 |
| 2016/0024354 A1 * | 1/2016 | Winterowd ............ C08L 97/02 524/14 |

FOREIGN PATENT DOCUMENTS

| | | |
|---|---|---|
| DE | 196 52 849 A1 | 6/1998 |
| DE | 10 2005 006 030 A1 | 8/2006 |
| DE | 10 2006 019 818 A1 | 11/2006 |
| DE | 60 2004 010 483 T2 | 12/2008 |
| EP | 1 570 916 A1 | 9/2005 |
| EP | 2 158 271 B1 | 3/2010 |
| JP | 0000S4838288 A | 9/1971 |
| RU | 2007144308 A | 6/2009 |
| RU | 2420396 C2 | 6/2011 |
| RU | 2449887 C2 | 5/2012 |
| RU | 2492196 C2 | 9/2013 |
| WO | 2008/141635 A1 | 11/2008 |

* cited by examiner

BROKEN DISPERSION FOR HYDROPHOBICIZING LIGNOCELLULOSE-CONTAINING MATERIAL

CROSS REFERENCE TO RELATED APPLICATIONS

This application is a U.S. national phase application under 35 USC 371 of PCT Application No. PCT/EP2016/065854, filed Jul. 5, 2016, which claims the benefit of priority to German Patent Application No. DE 10 2015 113 775.5, filed Aug. 19, 2015, and entitled "Broken Dispersion for Hydrophobicizing Lignocellulose-Containing Material," all of which are incorporated herein by reference in their entireties.

The invention relates to a broken dispersion for hydrophobicizing lignocellulose-containing material, a process for preparing hydrophobicized wood-base products and also hydrophobicized wood-base products obtainable therefrom. The invention further relates to the use of broken dispersion for hydrophobicizing a lignocellulose-containing material and/or a binder, to the use of a polyfunctional compound as a demulsifier to break a dispersion and also to a two-component system containing a dispersion and a demulsifier for hydrophobicizing lignocellulose-containing material and/or a binder.

The stability of wood-base products to resist water and ambient moisture is crucially determined by the swelling properties of the lignocellulose-containing material present therein. This type of water uptake, swelling and associated change in dimensions may give rise to issues in processing and everyday use. It is accordingly desirable in principle to reduce the water uptake and swelling of wood-base products. At the same time, wood-base products are designed to have a high level of flexural and transverse tensile strength and hence an adequate level of elasticity and stability. The requirements governing the determination of these parameters are found in various European standards, for example in DIN EN 312 (Particleboards. Specifications), EN 622 (Fiberboards. Specifications), DIN EN 319 (Particleboards and Fiberboards; Determination of Tensile Strength Perpendicular to the Plane of the Board) and DIN EN 317 (Particleboards and Fiberboards; Determination of Swelling in Thickness After Immersion in Water).

Particularly particleboards or fiberboards employed as supporting boards in laminate flooring have to meet high requirements regarding thickness swelling, edge swelling and water uptake. To comply with the stipulated limits, wood-base products or the lignocellulose-containing material present therein are often impregnated and/or coated with hydrophobicizing agents in the course of their manufacturing operation. The hydrophobicizing agent is intended to reduce water uptake and swelling, ideally without adversely affecting product properties such as flexural and transverse tensile strength.

Various forms of hydrophobicization are known from the prior art to decrease the penetration of water into wood-base. One option is to chemically convert the OH groups present in the wood constituents (cellulose, hemicelluloses, lignin) in order to reduce the hydrophilic character, particularly the water uptake capacity and swelling. Examples of existing processes here involve acetylating or silylating the OH groups.

In addition, various impregnating and/or coating media are employed in the wood-processing industry to hydrophobicize wood-base. It is typically natural or synthetic waxes or mixtures thereof which are used as the most cost-effective coating and/or impregnating media. Particle- or fiberboard manufacturers typically employ paraffins, for example in solid and/or molten form or as a paraffin dispersion. Commercially available paraffin dispersions are widely used in particular. These paraffin dispersions consist in the main of water and paraffin/paraffin wax and an emulsifier. The emulsifier prevents phase separation between the aqueous phase and the paraffin-containing phase and hence makes a decisive contribution to the stability and storability of the dispersion. Paraffin dispersions to hydrophobicize lignocellulose-containing material are employed in the wood-processing industry not just on account of their good storability, but also on account of their good meterability and ease of distribution. It is its liquid form which makes the paraffin dispersion easy to distribute over the lignocellulose-containing material as well as spray on. However, the ease of distribution has the disadvantage that the application of the hydrophobicizing medium often leaves an insufficient number of binding sites for the binder on the lignocellulose-containing material, preventing adequate wetting with the binder. This may lead to insufficient resination, which may in turn lead to some prolongation of the pressing operation and an attendant degradation in mechanical properties. An excessive proportion of paraffin dispersion used may further cause degradation of mechanical strength. To ensure adequate strength of wood-base, the concentration of the paraffin dispersion used should not exceed 2 wt % (solids/absolutely dry), based on the total weight of the lignocellulose-containing material.

Solid paraffins are also employed in commercial practice. Their punctuate application in molten form leaves spare binding sites for the binder on the lignocellulose-containing material. This punctuate form of application comes about because the solid paraffin is first melted and then sprayed onto the lignocellulose-containing material as droplets of liquid. Coming into contact with air, the liquid droplets of paraffin cool down and ultimately end up on the lignocellulose-containing material in the form of solidified droplets. As the wood-base is pressed hot, the paraffin remelts and distributes evenly over the wood-base and the binder. However, the use of solid paraffins has the disadvantage that melting entails increased energy requirements and a heightened risk of fire.

Proceeding from the above-reviewed prior art and its disadvantages, one problem addressed by the invention was that of providing an improved hydrophobicization medium and improved hydrophobicization processes for lignocellulose-containing materials.

Advantageous embodiments of the invention are specified in the dependent claims and are hereinafter specifically described, as is the invention as such.

The invention provides a broken dispersion for hydrophobicizing lignocellulose-containing material, wherein the broken dispersion is obtainable by mixing at least mixed
  A) a wax-containing dispersion containing the following components:
    i) at least one aqueous phase as continuous phase,
    ii) at least one disperse phase containing wax, and
    iii) at least one emulsifier,
    with
  B) a demulsifier having at least one functional group.

The broken dispersion may optionally contain further components, in particular additives.

It was found that, surprisingly, the prior art issues referred to above are very largely avoided or reduced on employing a broken dispersion instead of the familiar, intact wax-containing dispersions. This is because it transpired in practical tests that the broken dispersion of the invention combines the advantages of solid paraffins and the advantage of storage-stable paraffin dispersions.

The broken dispersion of the invention differs from "conventional" wax-containing dispersions in that the dispersion is a broken dispersion, i.e., it is no longer a homogeneous dispersion. This is accomplished by additionally adding a demulsifier having at least one functional group.

The good effectiveness of the broken dispersion was surprising. This is because the breaking of the wax-containing dispersion would in principle have been expected to disrupt the uniform distribution of the wax present therein and hence to render the wax-containing dispersion unstable. The use of such an unstable, inhomogeneous dispersion should have been expected to result not only in poor meterability and stability for the dispersion, an inhomogeneous distribution within the wood-base and/or on the lignocellulose-containing material present therein but also in an inhomogeneous and insufficient hydrophobicization of the wood-base and/or of the lignocellulose-containing material present therein. In effect, therefore, swell properties would have been expected to degrade.

And yet, surprisingly, practical tests with the broken dispersion of the invention gave wood-base products and/or lignocellulose-containing material evincing uniform hydrophobicization and also swelling within the wood-base and/or lignocellulose-containing material. Without wishing to be tied to any one specific scientific theory, it is believed that this surprising effect is a result of the broken dispersion according to the invention having the advantages both of solid paraffins and of storage-stable paraffin dispersions. The dispersion breaking is likely, as happens similarly with the molten paraffin systems known from the prior art, to result in a punctuate application of the wax, sparing binding sites for the binder on the lignocellulose-containing material. At the same time, however, the good meterability and distribution of the broken dispersion due to its liquid state is retained. As a result, and in contradistinction to the commercial wax-containing dispersions, adequate wetting with the binder is ensured, which is reflected in an improvement to the mechanical properties.

The invention is further based on the realization that removing the emulsifier typically present in commercial wax-containing dispersions improves the swell properties of the end product and/or of the lignocellulose-containing material present therein. Without wishing to be tied to any one specific scientific theory, it is believed that the demulsifier equipped with reactive (functional) groups reacts at least partly with the emulsifier present in the dispersion and thereby removes the emulsifier and/or makes it ineffective.

As will be known, swell properties depend on water uptake capacity. Emulsifiers often have a polar part and an apolar part and preferentially adsorb to the interfaces between two completely or substantially immiscible phases, explaining the emulsifying effect of emulsifiers. By virtue of their emulsifying effect, emulsifiers promote not only the water uptake and water miscibility in the wax-containing dispersion, but also the water uptake and water miscibility of the mixture formed from the wax-containing dispersion and of the lignocellulose-containing material. The facilitated water uptake and/or miscibility is able to significantly degrade the swell properties of the lignocellulose-containing material. The employment of the demulsifier in the manner of the present invention is able to reduce, or even prevent entirely, the emulsifier-based facilitated water uptake.

It is believed that the demulsifier reacts with the polar part of the emulsifier, deactivating the latter. The surprisingly positive effect of employing the demulsifier of the invention could at a minimum be explained by just the apolar portion of the emulsifier still being available, as a result of which the demulsifier-emulsifier product is able, for example, to also act as an additional hydrophobicizing agent.

A further advantage to the broken dispersion of the invention is that its usage is simple to integrate in the processes customarily practiced in the wood industry to form wood-base products. No burdensome intervening steps or processing interruptions are needed. The broken dispersion of the present invention may be pre-mixed and employed as a mixture. Alternatively, the wax-containing dispersion A) and the demulsifier B) may be mixed in the course of being admixed/applied to the wood material. Both types of admixing are thus readily integratable in existing processes of the wood industry. For example, the broken dispersion may be formed by mixing the wax-containing dispersion with the demulsifier in a customary static mixer and then be applied via the blowline. But the broken dispersion may also be formed in the course of admixture to the wood material by contacting the wax-containing dispersion with the demulsifier in the blowline before the resulting mixture (the broken dispersion) comes into contact with the wood material. Two-product nozzles are also employable for this purpose to particular advantage. It is for applications of this type that the invention also provides a two-component system (as a "kit-of-parts") comprising wax-containing dispersion A) and demulsifier B).

It is further advantageous that the broken dispersion employed according to the invention is readily available at low cost. One embodiment employs conventional wax-containing dispersions, in particular paraffin dispersions, to form the broken dispersion of the invention. Practical tests have shown that commercially available paraffin dispersions may be admixed with the emulsifier of the invention to cause dispersion breaking. This mixture may then be employed for hydrophobicization as a broken dispersion which is in accordance with the present invention. In one embodiment, the time at which the demulsifier is admixed to the wax-containing dispersion is only shortly before the latter is employed as hydrophobicizing agent. This not only takes advantage of the good shelf stability of commercial wax-containing dispersions, but also is a simple way to adjust the desired mixing ratio as between wax-containing dispersion and demulsifier to the particular requirements of the manufacturing process and/or of the wood-base product. Moreover, the emulsifier is also removable in this way, to distinctly reduce the water uptake and water miscibility of the lignocellulose-containing material.

The broken dispersion further exhibits good compatibility with the binders customarily employed in the wood industry, for example aminoplast resins. Good results are also obtained when the binder contains or consists of an isocyanate, in particular polymeric diphenylmethane diisocyanate (PMDI).

Swelling, transverse tensile strength and water uptake are important characteristics for wood-base products. Practical tests have shown that using the broken dispersion of the invention and/or the demulsifier of the invention makes it possible to reduce the amount of conventionally employed wax-containing dispersion without incurring any relevant degradation of these characteristics. At least one of these characteristics is improvable for the wood-base of the present invention versus "conventionally" hydrophobicized wood-base products (just paraffin dispersion without demulsifier, for example) without incurring any degradation of the other characteristics. Comparative tests against wood-base products hydrophobicized by means of conventional paraffin emulsions showed that the wood-base products of the invention, treated with the broken dispersion, had improved swelling properties coupled with an unchanged and/or improved transverse tensile strength.

The invention further also has economically relevant advantages: cost neutrality with regard to the input materials coupled with a simultaneously improved swelling property on the part of the wood-base products obtainable by the process and also cost saving through reduced dispersion usage coupled with unchanging swell properties.

The invention provides a broken dispersion and also a demulsifier for breaking a wax-containing dispersion. A person skilled in the art has in-principle knowledge of different processes for breaking a dispersion. Examples thereof are chemical methods of splitting (salt splitting, acid splitting), physical methods of splitting (thermal methods), mechanical methods (membrane processes, flotation), electrochemical methods (electrocoagulation, electrophoresis) or adsorption methods.

The broken dispersion of the present invention is obtained by "breaking" the wax-containing dispersion by means of a demulsifier. Any reference herein to "breaking" or "broken" is to be understood as meaning a complete or partial form of phase separation as for the continuous phase from the disperse phase. In other words, the phases de-mix to a partial extent at least, i.e., the disperse phase is not or only partially dispersed in the continuous phase. The broken dispersion of the present invention involves at least a partial form of phase separation. Broken dispersions are exemplified in FIGS. 3a to 3d and FIG. 4.

This at least partial form of phase separation of the dispersion is typically effected according to the invention by reacting the demulsifier B) with a constituent of the wax-containing dispersion A) to cause the emulsifier to lose at least some of its emulsifying effect, causing the dispersion to break. In one embodiment, the demulsifier reacts with a constituent, an additive in particular, contained in component A) to change the conditions, for example the pH, in the wax-containing dispersion and/or the broken dispersion and thereby nullifying the emulsifying effect of the emulsifier. In a preferred embodiment, the demulsifier reacts (directly or indirectly) with the emulsifier to form, as between the demulsifier and the emulsifier, a reaction product which is then present in the broken dispersion. As the emulsifier reacts, it loses its emulsifying properties, which is believed to be the cause of the dispersion breaking observed.

The broken dispersion of the invention is obtained by mixing the wax-containing dispersion with the demulsifier. This mixture is employed in the invention for hydrophobicizing lignocellulose-containing material. In one embodiment, the lignocellulose-containing material and/or wood-base is hydrophobicized by employing a dispersion wherein at least one phase of this dispersion contains the broken dispersion.

Dispersions and/or disperse systems are known in principle to a person skilled in the art (cf. "Pharmazeutische Technologie", Voigt, Deutscher Apotheker Verlag Stuttgart, 2000, pp. 81 ff.). "Dispersion" refers to a system of two or more phases, at least one of which is a continuous phase, known as the dispersion medium, and at least one other is dispersed therein, which is known as the disperse or dispersed phase (cf. also DIN EN ISO 862:1995-10). The continuous phase may take the form of a liquid, of a solid or of a mixture thereof. The continuous phase is typically liquid or liquid-solid. Any reference here or elsewhere to "liquid" is to be understood as meaning room temperature (25° C.) liquid solutions and/or dispersions. Unless otherwise stated, all the values recited herein are measured at standard pressure. According to the invention, the continuous phase of the wax-containing dispersion is an aqueous phase. The aqueous continuous phase of the invention contains essentially water or consists thereof. "Essentially" here is to be understood as meaning not less than 80 wt %, 90 wt %, 95 wt %, 99 wt % or 99.9 wt %, all based on the total weight of the aqueous continuous phase. The disperse phase of the wax-containing dispersion, by contrast, contains wax or consists thereof. More particularly, the disperse phase may take the form of a liquid, of a solid or of a mixture thereof.

For the purposes of the present invention, the disperse phase in the intact, i.e., as yet unbroken, dispersion is finely dispersed in the continuous phase of the wax-containing dispersion. Any reference herein to "finely dispersed" is to be understood as meaning a colloidal dispersion (1 nm to 1 μm particle diameter of the disperse phase) and/or a coarse dispersion (particle diameter of disperse phase above 1 μm) of the particles of the disperse phase. In a colloidal solution, the particle diameter of the disperse phase is less than 1 nm. The disperse phase may form a monodispersion or heterodispersion. In a monodispersion, the particles of the disperse phase have approximately the same particle diameter. In a heterodispersion, particles of the disperse phase are present in different particle diameters. A person skilled in the art has knowledge of various definitions for "particle diameter" and of methods for determining the particle diameter (cf. "Pharmazeutische Technologie", Voigt, Deutscher Apotheker Verlag Stuttgart, 2000, pp. 29 ff.). Any reference here to "particle diameter" is to be understood as meaning the average diameter of the circle having the same area.

A dispersion within the meaning of the invention may further be selected from a colloidal solution, emulsion, suspension, an aerosol or a foam. The at least two phases of these dispersions may each independently themselves be a dispersion. These dispersions may further contain yet a further phase, for example a further disperse phase.

In one embodiment, the wax-containing dispersion is an emulsion. An emulsion typically contains two mutually immiscible liquid phases. A person skilled in the art has knowledge of emulsions (cf. "Pharmazeutische Technologie", Voigt, Deutscher Apotheker Verlag Stuttgart, 2000, pp. 343 ff.). In principle, a person skilled in the art classifies the phases of the emulsion into a so-called "oily" phase and an "aqueous" phase. Any reference here and elsewhere to "oily phase" is to be understood as meaning in principle a lipophilic phase. Any reference here and elsewhere to "aqueous phase" is to be understood as meaning in principle a hydrophilic phase, which contains or consists of water. The emulsion within the meaning of the invention is a dispersion containing at least one emulsifier, at least one aqueous continuous phase and an oily disperse phase which contains wax. However, the emulsion may also contain a further oily phase.

In one embodiment, the emulsion is an oil-in-water emulsion. An oil-in-water emulsion is understood by a person skilled in the art as being an emulsion where the oily phase has been dispersed into the aqueous phase. In this embodiment, the continuous phase contains the aqueous phase and the oily phase contains a wax.

In a further embodiment, the emulsion is a multiple dispersion, in particular a water-in-oil-in-water emulsion or an oil-in-water-in-oil emulsion. Multiple emulsions are known to a person skilled in the art. These multiple emulsions have at least one disperse phase into whereinto a further disperse phase has been dispersed. In the case of the water-in-oil-in-water emulsion (W/O/W emulsion) the first or outer continuous phase is the aqueous phase and the phase finely dispersed therein is the wax-containing phase. A further aqueous phase has additionally been dispersed into this wax-containing phase. In the case of the oil-in-water-in-oil emulsions (O/W/O emulsion) the first or outer continuous phase is an "oily" phase and the phase finely dispersed therein is the aqueous phase. The wax-containing phase has been dispersed into this aqueous (continuous) phase, meaning that the aqueous phase is the continuous phase and the wax-containing phase is the disperse phase.

In one embodiment, the broken dispersion is a broken multiple emulsion. In another embodiment, the lignocellulose-containing material and/or wood-base is hydrophobicized by employing a multiple emulsion wherein at least one phase of this multiple emulsion contains the broken dispersion as a whole or in part.

A single emulsion and a multiple emulsion are exemplified in FIGS. 1 and 2. In one embodiment of the single emulsion, the aqueous continuous phase is the continuous phase (2) and the wax-containing phase is the disperse phase (3) of FIG. 1. In another embodiment of the multiple emulsion, the continuous aqueous phase of the wax-containing dispersion according to the invention is the disperse phase (3) and the wax-containing one is the disperse phase (4) of FIG. 2.

Broken single or multiple dispersions are exemplified in FIGS. 3a to 3d. In one embodiment of the single emulsion, the aqueous phase is the continuous phase (2) and the wax-containing phase is the disperse phase (3) of FIG. 3a. In another embodiment of the multiple emulsion, the continuous aqueous phase of the wax-containing dispersion according to the invention is the disperse phase (3) and the wax-containing one is the disperse phase (4) of FIG. 3b.

In a further embodiment of the invention, the dispersion is a suspension. Suspensions are in principle known to a person skilled in the art as dispersions which contain at least a liquid continuous phase and a solid disperse phase. A "suspension" within the meaning of the invention is a dispersion which contains an emulsifier and where the continuous phase contains the aqueous phase and the disperse phase contains wax. The suspension may additionally yet contain at least one further disperse phase.

It is conceivable, moreover, for the dispersion to be also employable as aerosol or as foam/mist or atomization. Aerosols and also foams may be employed directly or formed in practice, for example in the course of the sprayed or jetted application of the wax-containing dispersion and/or of the broken dispersion.

In one embodiment, the dispersion is an aerosol which contains the wax-containing dispersion and/or the broken dispersion. Aerosols are in principle known to a person skilled in the art as dispersions having a gaseous continuous phase and a solid or/and liquid disperse phase. In this embodiment, the disperse phase of the aerosol is the wax-containing and/or broken dispersion and the continuous phase is a gaseous phase, in particular air and/or water vapor.

In a further embodiment of the invention, the dispersion is a foam which contains the wax-containing dispersion and/or the broken dispersion. Foams are in principle known to a person skilled in the art as dispersions which contain a continuous liquid phase and a gaseous disperse phase. In this embodiment, the continuous phase of the foam is the wax-containing and/or the broken dispersion and the disperse phase is a gaseous phase, in particular air and/or water vapor.

The dispersion of the invention may additionally contain at least one further additive. Additives may be fire control agents, fungal control agents, conductivity modifiers, dyes or colorants, solvents, solubilizers, viscosity-adjusting agents, wetting agents, emulsifiers, pH-adjusting agents, fats, fatty acids or stabilizers.

The dispersion within the meaning of the invention further contains an emulsifier. Emulsifiers are employable in an amount of 0.1 to 10 wt %, preferably at from 0.2 to 6 wt % and more preferably 0.2 to 4.0 wt %, all based on the total weight of the dispersion. Various emulsifiers and also their construction and method of working are in principle known to a person skilled in the art (cf. "Pharmazeutische Technologie", Voigt, Deutscher Apotheker Verlag Stuttgart, 2000, pp. 348 ff.). Emulsifiers stabilize dispersions or contribute to their stabilization. Any reference herein to "emulsifier" is to be understood as meaning any dispersing agent that stabilizes a dispersion as a whole or in part. Typically, an emulsifier within the meaning of the invention is a surface-active substance that facilitates the dispersal of at least one disperse phase in a continuous phase. By "surface-active substance" is meant a compound which accumulates at interfaces between at least two mutually immiscible phases and thereby lowers the interfacial tension and/or the surface tension or contributes to said lowering. The entire or partial lowering of the surface tension and/or the interfacial tension between at least two phases promotes the dispersal of the at least one disperse phase in the continuous phase of the dispersion. Surface-active substances are typically amphoteric substances, which have both hydrophilic and lipophilic properties. These surface-active substances and/or emulsifiers are classifiable by HLB value and/or into O/W emulsifiers, W/O emulsifiers or mixtures thereof (cf. "Pharmazeutische Technologie", Voigt, Deutscher Apotheker Verlag Stuttgart, 2000, pp. 348 ff.). HLB here stands for "hydrophilic-lipophilic balance", a term of art familiar to a person skilled in the art.

An "emulsifier" within the meaning of the invention may also be a surfactant, in particular a nonionic, anionic, cationic or amphoteric surfactant. Surfactants are understood by a person skilled in the art as being substances that lower the surface tension of a liquid or the interfacial tension between two phases and stabilize the formation of dispersions and/or contribute to their stabilization. Surfactants are accordingly surface-active substances. In principle, surfactants consist of an apolar (hydrophobic) part and a polar (hydrophilic) part. An alkyl group, for example, may serve as the apolar part. The polar part, which may have a differing construction, determines the classification of the surfactants into nonionic, anionic, cationic and amphoteric surfactants. Nonionic surfactants may have an alcohol moiety (C12-C18) as the apolar group and a hydroxyl group and/or an ether group as polar groups. Anionic surfactants have at least one negatively charged functional group. The polar group may in this case be a negatively charged functional group, in particular $-COO^-$ (carboxylate), $-SO_3^-$ (sulfonate) or $-SO_4^{2-}$ (sulfate). Cationic surfactants may for example have a quaternary ammonium group ($R_4N^+$) as polar group. Amphoteric surfactants (or else zwitterionic surfactants) have both a negatively and a positively charged functional group, in particular a carboxylate group ($R-COO^-$) together with a quaternary ammonium group ($R_4N^+$).

Further examples of emulsifiers within the meaning of the invention are alcohol polyethylene glycol ethers (general formula $R-O-(R^1-O)_n-H$), fatty acid ester polyethylene glycol ethers (general formula $R-COO-(R^1-O)_n-H$), alkyl polyalkylene glycol ether carboxylic acids (general formula R—O—(R¹—O)$_n$—CH$_2$—COOH), alkanol-ammonium or alkaline or alkaline earth metal salts of alkyl polyalkylene glycol ether carboxylic acids (general formula R—CONH(CH$_2$)$_u$N$^+$(CH$_3$)$_2$—CH$_2$—COO$^-$), amine oxides (general formula R—NO(CH$_3$)$_2$), wherein R in each case represents a branched or linear, saturated or unsaturated C8 to C20 and/or C7 to C19 hydrocarbyl moiety, n represents a number from 2 to 20, R¹ represents an alkylene moiety of 2 to 4 carbon atoms, for example —C$_2$H$_4$— or —C$_3$H$_6$—, optionally different for each n, and u represents a number from 1 to 10. Further examples of emulsifiers are products from the alkoxylation of triglycerides wholly or partially esterified with C6 to C22 fatty acids, where from 2 to 40 moles of alkoxylating agent are used per mole of triglyceride, partially neutralized partial glycerides of mono- or polybasic C2 to C22 carboxylic acids, for example linoleic acid, stearic acid, isostearic acid, palmitic acid, lauric acid, caprylic acid, capric acid, citric acid and/or lactic acid. Emulsifiers within the meaning of the invention may also be esters of polyglycerol wherein the carboxylic acid group may preferably have from 2 to 22 carbon atoms, C6 to C32 carboxylic acids, in particular C8 to C26 fatty acids fully or partially, in particular fully, saponified, for example with amines or amine compounds such as alkanolamines, in particular diethanolamine and/or triethanolamine. In one embodiment, the alkanolamine is a silylated alkanolamine, in particular a doubly or triply silylated alkanolamine.

Anionic emulsifiers further include, for example, carboxylates, in particular alkali metal, alkaline earth metal and ammonium salts of fatty acids, for example potassium stearate, which are usually also referred to as soaps, acylglutamates, sarcosinates, for example sodium lauroylsarcosinate, taurates, methyl-celluloses, alkyl phosphates, in particular alkyl esters of monophosphoric and disphosphoric acid, sulfates, in particular alkyl sulfates and alkyl ethyl sulfates, sulfonates, further alkyl and alkylaryl sulfonates, in particular alkali metal, alkaline earth metal and ammonium salts of arylsulfonic acids and also alkyl-substituted arylsulfonic acids, alkylbenzene-sulfonic acids, for example lignin- and phenolsulfonic acid, naphthalene- and dibutylnaphthalenesulfonic acids, or dodecylbenzenesulfonates, alkylnaphthalene-sulfonates, alkyl methyl ester sulfonates, condensation products of sulfonated naphthalene and derivatives thereof with formaldehyde, condensation products of naphthalenesulfonic acids, phenol- and/or phenolsulfonic acids with formaldehyde or with formaldehyde and urea, mono- or dialkyl sulfosuccinates, and also protein hydrolysates and ligninsulfite waste liquors, optionally in the form of their neutral or any basic salts. Nonionic emulsifiers include, for example, fatty alcohol alkoxylates and oxo process alcohol alkoxylates, in particular ethoxylates and propoxylates having degrees of alkoxylation at typically from 2 to 80 and particularly from 3 to 40, for example alkoxylates of C8 to C30 alkanols or alk(adi)enols, for example of isotridecyl alcohol, lauryl alcohol, oleyl alcohol or stearyl alcohol and also their alkyl ethers and alkyl esters, for example their acetates, alkoxylated animal and/or vegetable fats and/or oils, for example maize oil ethoxylates, castor oil ethoxylates, tallow fat ethoxylates having degrees of alkoxylation at typically from 2 to 80 and particularly from 3 to 40, glycerol esters, for example glycerol monostearate, fatty acid esters of polymeric alkoxylates, particularly of polyethylene oxides having degrees of alkoxylation at from 3 to 100 such as, for example, PEG 300 oleate, stearate or laurate, as mono- or diesters, copolymeric alkoxylates formed from ethylene oxide and propylene oxide, alkylphenol alkoxylates, for example ethoxylated isooctyl-, octyl- or nonylphenol, tributylphenol polyoxyethylene ethers having degrees of alkoxylation at typically from 2 to 80 and particularly from 3 to 50, fatty amine alkoxylates, fatty acid amide and fatty acid diethanol-amidealkoxylates having degrees of alkoxylation at typically from 2 to 80 and particularly from 3 to 50, in particular their ethoxylates, sugar surfactants, sorbitol esters, for example sorbitan fatty acid esters (sorbitan monooleate, sorbitan tristearate), polyoxyethylene sorbitan fatty acid esters, alkylpoly-glycosides, N-alkylgluconamides, alkyl methyl sulfoxides, alkyldimethylphosphine oxides, for example tetradecyl dimethylphosphine oxide.

Further examples of emulsifiers are perfluoro-emulsifiers, silicone emulsifiers, phospholipids, for example lecithin or chemically modified lecithins, amino acid emulsifiers, for example N-lauroylglutamate. Emulsifiers within the meaning of the invention also include high molecular weight substances such as gum arabic, gum ghatti or cellulose compounds. It is further also possible to use emulsifier mixtures, for example an anionic emulsifier plus a nonionic emulsifier. Emulsifiers within the meaning of the invention further include fatty alcohols, in particular fatty alcohols having a chain length of 12 to 22 carbon atoms.

Usable emulsifiers within the meaning of the invention further also include fatty alcohols. Fatty alcohols are typically alkanols and are usually derived from fatty acids via a chemical reaction. In it, the —COOH carboxyl group typical of carboxylic acids is converted into the —OH hydroxyl group typical of alcohols. The carbon atom of the —COOH group survives as —CH$_2$—OH. Since fatty acids usually have an even number of carbon atoms, the corresponding fatty alcohols also have an even number. Unsaturated fatty acids give rise to unsaturated fatty alcohols. The term "fatty alcohol" is used for alcohols having a chain length of six (hexanol) up to 22 carbon atoms (behenyl alcohol). Higher primary alcohols having 24 to 36 carbon atoms are referred to as waxy alcohols. These are found in the bound form of carboxylic esters in natural waxes, for example lanolin.

Emulsifiers within the meaning of the invention further also include, for example, fatty acids having a chain length of 10 to 26 and particularly of 12 to 24 carbon atoms. "Fatty acids" is a group name for monocarboxylic acids, which have one carboxyl group (—COOH) and one hydrocarbon chain. Fatty acids may be linear or branched. A person skilled in the art further differentiates between saturated and unsaturated fatty acids. A saturated fatty acid is a fatty acid without double bonds between carbon atoms. Saturated fatty acids form a so-called homologous series having the empirical formula C$_n$H$_{2n+1}$COOH. Unsaturated fatty acids have a or one double bond and polyunsaturated fatty acids have two or more double bonds between the carbon atoms of the chain.

In one embodiment, the emulsifier is selected from the group consisting of diethanolamine, triethanolamine, silylated di- or triethanolamine, diethanolglycine, octadecanol, a fatty acid having a chain length of 10 to 26, particularly of 12 to 24 carbon atoms, urea and mixtures thereof.

The invention further provides a demulsifier having at least one functional group, the use of which leads to the broken dispersion of the present invention. A "demulsifier" within the meaning of the invention is any substance that leads to the destabilizing and/or breaking of a dispersion. The functional group of the demulsifier should be capable of reacting with and/or crosslinking at least one constituent of the dispersion, in particular the emulsifier. The functional group of the demulsifier may also be capable of reacting with and/or crosslinking at least one additive. A demulsifier within the meaning of the invention may also have two or more functional groups, i.e., be polyfunctional. These functional groups may be identical to or different from each other.

In a preferred embodiment, the demulsifier reacts with the emulsifier which is present in the wax-containing dispersion. The broken dispersion therefore preferably contains a reaction product formed from the emulsifier and the demulsifier. Without wishing to be tied to any one scientific theory, this reaction is believed to be responsible for the breaking of the dispersion, since the emulsifier in this reaction product is no longer sufficiently capable of exerting its emulsifying effect.

In one embodiment, the demulsifier of the invention is a functional compound (i.e., there is at least one functional group per demulsifier molecule), in particular a polyfunctional compound. Polyfunctional here means that the demulsifier molecule contains more than one functional group, in particular different functional groups. In one embodiment, at least one of the functional groups is an isocyanate group. The demulsifier is thus preferably an isocyanate, in particular a polyisocyanate. But the isocyanate may also have a further functional group other than isocyanate. Any reference here and elsewhere to isocyanates is to be understood as also meaning polyisocyanates. In a further preferred embodiment, the demulsifier is an aromatic isocyanate, in particular a polymeric diphenylmethane diisocyanate (PMDI).

Aliphatic and cycloaliphatic isocyanates usable as a demulsifier within the meaning of the invention may be selected from hexamethylene diisocyanate, isophorone diisocyanate and 1,4-cyclohexyl diisocyanate. Aromatic polyisocyanates, tolylene diisocyanate and polymeric diphenylmethane diisocyanate (PMDI).

In one embodiment, the binder contains or even consists of PMDI. In this case, the total amount of polymeric diphenylmethane diisocyanate (PMDI) may be from 0.1 to 400 wt % (solids/solids), preferably from 5 to 200 wt % (solids/solids) and more preferably from 10 to 100 wt % (solids/solids), all based on the total solids weight of the broken dispersion and of the binder.

In an alternative embodiment, the at least one functional group of the demulsifier is an epoxide, in particular a bifunctional epoxide.

In a further embodiment of the invention, the amount in which the demulsifier is employed for forming the broken dispersion is from 0.05 to 1 wt % (solids/solids), preferably from 0.08 to 0.8 wt % (solids/solids) and more preferably from 0.1 to 0.5 wt % (solids/solids), all based on the total solids weight of the broken dispersion.

The demulsifier is employable in solid form, in liquid form or as a dispersion. In particular, the demulsifier may be in a liquid form having a 100 wt % solids content, based on the total weight of the demulsifier.

The broken dispersion of the invention further contains a wax. In one embodiment, the wax is selected from natural waxes and/or paraffin. In a preferred embodiment, the paraffin is selected from $C_{10}$ to $C_{50}$ alkanes and paraffin wax. The paraffin wax may be particularly selected from the group consisting of petroleum-based paraffin waxes, soft waxes, Fischer-Tropsch paraffins and also mixtures and refinery products thereof.

In one embodiment, the dry matter content of the wax-containing dispersion is from 10 to 90 wt %, preferably from 20 to 80 wt % and more preferably from 30 to 70 wt %, all based on the total weight of the wax-containing dispersion.

The wax or the wax-containing dispersion may further contain fatty acids. In one embodiment, the wax-containing dispersion contains
    10 to 95%, preferably 15 to 90 wt % of $C_{10}$ to $C_{50}$ alkanes and/or
    1 to 70%, preferably 2 to 60 wt % of fatty acids, all based on the total amount of dry matter in the wax-containing dispersion.

The term "wax" as used in the present invention encompasses natural wax, synthetic wax, modified wax and/or mixtures thereof. Waxes are obtainable and/or derivable in a wholly or partly synthetic manner or by isolation and/or extraction. Processes for producing/deriving waxes are known in principle to a person skilled in the art.

Synthetic waxes, the main constituent of which is typically (hard) paraffin, are for example mainly derived from mineral oil. "Mineral oil" is understood by a person skilled in the art as a collective term for the liquid products—consisting essentially of mixtures of saturated hydrocarbons—derived by distillation from mineral raw materials (petroleum, lignitic and bituminous coals, wood, peat). Similarly, the solid and half-solid mixtures of higher hydrocarbons are occasionally referred to as mineral fats and/or waxes. Examples thereof are ceresin, Vaseline, paraffin. The analysis of mixtures of fatty and mineral oils can be carried out via IR spectroscopy and/or by determining the fat specification numbers, for example by determining the unsaponifiables. These analytical methods as well as the determination of the fat specification numbers are known in principle to a person skilled in the art (cf. "Analytik II", Ehlers, Deutscher Apothekerverlag Stuttgart, 2002, pp. 91-192).

A complete synthesis, as for example with polyethylenes, is also possible. Synthetic waxes include, for example, polyalkylene waxes (polyolefin waxes, polyethylene waxes, polypropylene waxes), polyethylene glycol waxes, amide waxes. Fully synthetic hydrocarbon waxes, which include Fischer-Tropsch waxes and the polyolefin waxes, are obtainable by high, medium and low pressure polymerization processes from the raw materials derived in coal gasification and petrochemically. The "hydrocarbon" waxes are frequently functionalized with carboxyl groups by subsequent oxidation (as, for example, with polyethylene wax oxidates) or else, as in the case of the polyolefin waxes, via comonomers. Fatty acids, which may have a carbon chain of 12 to 28 carbon atoms, are the basis for mono-, bis- and polyamide waxes.

Waxes within the meaning of the invention may further also be natural waxes and also entirely or partially chemically modified waxes. Natural waxes are usually derived by extraction with subsequent cleaning/purification (filtration), bleaching and compounding. Chemical further processing as by oxidation, esterification and saponification gives chemically modified and/or partly synthetic waxes.

Waxes are generally multicomponent systems and are also definable via their mechanical-physical properties. Waxes are characterized, for example, via their oil content, melting point and/or viscosity. "Wax" within the meaning of the invention also comprehends generally organic compositions that are solid at 25° C., for example at standard pressure (1013 mbar) from malleably soft to kneadable to brittly hard. Waxes melt above the congealing point without decomposing, only to form at a little above the melting point a liquid of relatively low viscosity and devoid of ropiness. Wax may contain a proportion of long-chain hydrocarbons. Aliphatic long-chain hydrocarbons within the meaning of the invention are compounds consisting of carbon and hydrogen and having specifically congealing points of 35 to 150° C., preferably of 40 to 100° C. at standard pressure and/or in relation to the product composition and/or irrespective thereof have average carbon chain lengths of 20 to 100 carbon atoms, in particular of 20 to 50 carbon atoms. Hydrocarbons as employed for the purposes of the invention may be saturated, unsaturated, linear, branched, cyclic hydrocarbons and/or mixtures thereof. In one embodiment, the wax contains or consists of saturated hydrocarbons. Practical tests have shown that customary commercial waxes employed in the wood-base industry are usable to form the broken dispersion of the invention. Commercial waxes and/or wax dispersions for hydrophobicizing wood-base are usually paraffin dispersions. These in addition to paraffin and/or paraffin wax often contain at least one further wax, oil or fatty acids.

The wax-containing dispersion may contain a natural wax. "Natural wax" within the meaning of the invention may be a vegetable wax, an animal wax and/or a mineral wax. The natural wax may be a wholly or partly chemically modified natural wax. Examples of natural vegetable waxes are cotton wax, carnauba wax, candelilla wax, esparto wax, guarama wax, japan wax, cork wax, montan wax, Ouricury wax, rice germ oil wax, sugarcane wax. Animal natural waxes are beeswax, preen gland wax, lanolin, shellac wax, spermaceti. Mineral waxes include, for example, micro-waxes, ceresin, ozokerite.

The term "natural wax" in the narrower sense may also mean a collective designation for esters of long-chain fatty acids (C24-C36) (waxy acids) with long-chain alcohols (fatty alcohols), in particular cetyl alcohol (1-hexadecanol) and stearyl alcohol (1-octadecanol), triterpene or steroid alcohols, in particular ambrein or betulin, which occur widely in plants and animals. Also present may be waxes such as beeswax or carnauba wax, which each contain free carboxyl and hydroxyl groups, which have an emulsifying effect.

Waxes within the meaning of the invention may further also be so-called Fischer-Tropsch waxes, i.e., waxes obtainable by Fischer-Tropsch synthesis.

In a preferred embodiment, the wax is paraffin. Any reference here and elsewhere to "paraffin" is to be understood as also meaning paraffin wax. Paraffins are in principle known to a person skilled in the art. Paraffin in pure form typically has a white translucency. It is insoluble in water, but readily soluble in kerosene, ether and chloroform. Paraffins are typically composed of unbranched (n-) and branched (iso-)alkanes. A distinction is made between thinly liquid paraffins (paraffinum perliquidum), which have a viscosity of 25 to 80 mPa·s, thickly liquid paraffins (paraffinum subliquidum), which being an oily liquid have a viscosity of 110 to 230 mPa·s, and hard paraffins (paraffinum solidum), which being a solid mass have a congealing temperature of 50 to 65° C. n-Alkanes may dominate in hard paraffins. Paraffins for the purposes of the inventions may also be multicomponent mixtures containing wholly or partially saturated hydrocarbons, linear, branched, cyclic alkanes and/or mixtures thereof.

In one embodiment, the wax contains or consists of paraffin wax. The paraffin waxes typically used in the industry are products of petroleum refining and consist mainly of mixtures in different ratios of n- and isoalkanes that are solid at above 35° C. Paraffin waxes are usually subdividable into macro- and microcrystalline waxes. Macrocrystalline paraffin waxes consist predominantly of saturated, straight-chain, unbranched hydrocarbons (n-alkanes) and have a molecular weight between 280 and 700 g/mol (the number of carbon atoms in the chain is on average between 20 and about 50). In contradistinction to macrocrystalline paraffins, microcrystalline paraffins consist predominantly of branched alkanes (isoalkanes) and saturated ring-shaped hydrocarbons (cycloalkanes). The melting range is typically from 60 to 90° C. Microcrystalline paraffins are also obtainable by hydro-isomerization of Fischer-Tropsch waxes.

Fischer-Tropsch wax refers to the paraffin derived via a Fischer-Tropsch process. The number of carbon atoms in the chain is in the range from 20 to 100. The congealing point is in the range from 35° C. to 105° C. (cf. also A. Kühnle in Fette, Seifen, Anstrichmittel volume 84, issue 4, pages 156-162).

In one embodiment, the wax contains or consists of a soft wax. Soft waxes are definable in various ways. Soft waxes are typically products of petroleum refining and have oil fractions above 20 wt % and congealing points of above 10° C., in particular not less than 20° C. The oil fraction therein is liquid at not more than 10° C. A composition of matter containing the above oil fraction is typically termed a wax and/or a soft wax when it is solid at above 10° C., in particular at above 25° C., is, for example, from malleably soft to kneadable to brittly hard, and has a softening point below 65° C. (all at standard pressure, 1013 mbar). Soft waxes also include solid-state mixtures of solid paraffins and separably liquid hydrocarbons (corresponds to the oil and/or oil fraction). Mixtures in the form of paraffinic soft waxes may have softening points up to 65° C. They contain not only the customary comparatively high-melting waxes (separately for example above 40° C. in a proportion of above 65 wt %) but also low molecular weight hydrocarbons (oil fraction) which are liquid at room temperature (25° C.). These soft waxes are obtainable from petroleum waxes, i.e., from geological sources, and/or from artificially produced synthetic waxes and/or contain constituents of this type. The n-paraffin, isoparaffin and oil contents of waxes vary with the origin of the petroleum and the type of refinery process.

A person skilled in the art distinguishes soft waxes from hard waxes. Soft waxes have a typical density between 0.80 and 0.85 g/cm$^3$ and include on average (number average) hydrocarbons having more than 16 carbon atoms. Soft waxes consist mainly of n- and iso-paraffins and also room temperature liquid hydrocarbons (oil). The lower end of the soft waxes with respect to the congealing point is formed by the foots oils having a melting point and/or range of 35 to 45° C., which contain a lot of oil comparatively, and the upper end is formed by the slack waxes having a melting point of for example 35 to 65° C. Depending on the provenience of the wax, the oil fraction may be up to 35 wt %. Strongly oil-containing foots oils are obtained in the deoiling of slack waxes. Foots oils may have oil fractions above 30 wt %.

This oil fraction is a further characteristic feature of waxes which is of relevance for commercial practice. Waxes with high oil fractions exert but a weak hydrophobicizing effect, which is why waxes having a low oil fraction are preferred in commercial practice. Practical tests have shown that, surprisingly, wood-base products having improved properties of swell were obtained even when the wax employed for hydrophobicizing purposes in the broken dispersion had a comparatively high oil fraction. It is commonly/generally known to a person skilled in the art how to determine the oil fraction. The oil fraction is determined, for example, as described in the ASTM D3235 ("Standard Test Method for Solvent Extractables in Petroleum Waxes"). To this end, the sample portion is dissolved in a solvent (a 50% methyl ethyl ketone and 50% toluene mixture), and the solution is cooled down in order to separate out the paraffin and filtered. The mass fraction of the filtrate which is attributable to oil is determined by weighing the residue left after the solvent has been evaporated. "Oil" by this method can also be defined as a collective term for the solids (evaporation residue) soluble at room temperature in a 50% methyl ethyl ketone and 50% toluene mixture.

Yet "oils" are definable in various ways. For one thing, oils are distinguished from fats. "Oils" and "fats" may be solid, half-solid or liquid, more or less viscous products of the vegetable or animal body which consist in chemical terms of mixed triacylglycerols of higher fatty acids having an even number of carbon atoms and also low fractions of acyllipids (sterol esters for example) and unsaponifiable fractions. The fats are solid or half-solid at 20° C. and oils are liquid at 20° C. On the other hand, "oil" is also a collective term for water-insoluble organic compounds of relatively low vapor pressure which are liquid at 20° C., which have a similar physical consistency in common and not a coincident chemical constitution. Oils have a relatively high viscosity, they are soluble in almost all organic solvents. Oils may be selected from mineral oils, being in particular wholly synthetic oils such as, for example, silicone oils, vegetable and/or animal fatty oils, essential oils. For the purposes of the present invention, one or more of these definitions is invokable for the term oil.

The invention further provides a process for preparing a wood-base product comprising the steps of
 a) providing particles of wood,
 b) resinating the particles of wood with a binder,
 c) compressing the resinated particles of wood to form a wood-base product,
wherein before, during or after step b) the particles of wood and/or the binder are brought into contact with a broken dispersion.

The invention also provides wood-base products, i.e., engineered products consisting of or containing wood. In one embodiment of the invention, the wood-base product is a wood-base particleboard. The wood-base particleboard is preferably an OSB or a flakeboard. In another embodiment of the invention, the wood-base product is a wood fiber fiberboard, in particular an MDF or HDF board.

Wood-base products are in principle subdividable into particle-type and fiber-type wood-base products. A person skilled in the art considers wood-base particleboards and fiberboards to be fundamentally different categories of engineered product, which are distinguishable but nonetheless fall within the term "wood-base product" for the purposes of the present invention. Wood-base particleboards (flakeboards in the wider sense) are a product group within the wood-base products which are formed from wood particles and a binder using heat and pressure. Examples thereof are flakeboards, flat press boards, single-layer boards, multi-layer boards, lightweight flat press boards, extruded boards, extruded tubular (ET) boards, extruded solid (ES) boards, melamine-faced boards (MFBs), flakewood moldings or oriented strand boards (OSBs). Particle- or flakeboards are classifiable according to DIN EN 312 in that they can differ in strength and moisture resistance. OSBs are classifiable by their use according to EN 300. Such wood-base particleboards are further processable into, for example, laminates, floorings, worktops, table tops, pallets and/or shaped wood-base articles.

Fiber-type wood-base products further also include fiberboards, for example medium density fiberboard (MDF) and high density fiberboard (HDF). In contradistinction to particle-type wood-base products, the wood used in the manufacture of fiberboard is destructurized down to the wood fiber, bundles of fiber or fragments of fiber. The structural coherence of fiberboard rests essentially on the interfelting of wood fibers and on their wood-specific binding forces, but adhesives are also employable as binders. The fiber is produced from lignified-type plant material. This is done by hogging the raw material, then steaming, cooking and chemical and/or mechanical destructurizing down to the individual fiber, to the fiber bundle or to fragments of fiber. A person skilled in the art classifies the production process as to whether it is a wet process (comprising a step of sedimenting the fibers from an aqueous suspension of fiber to form a fibrous nonwoven web) a dry process (comprising a step of densifying dry fiber into a fibrous nonwoven web mechanically or pneumatically). Wood fiber fiberboards produced by the wet process are classified according to whether they are porous, medium-hard or hard fiberboards. Wood fiber fiberboards produced by the dry process are classified according to whether they are medium density or high density fiberboards, this group additionally also includes gypsum-bonded fiberboards. The mats formed are subsequently compression molded.

The wood-base product and/or its precursor or intermediate form preferably consists essentially of at least one binder and the lignocellulose-containing material hydrophobicized using the broken dispersion. "Essentially" here is to be understood as meaning not less than 90 wt %, 95 wt %, 99 wt % or 99.9 wt %, all based on the total weight of the wood-base.

However, it is also possible for the wood-base product and/or its precursor or intermediate form to contain an additive and/or further chemistries. For example, wetting and/or release agents may be added for an improved pressing operation. It is further possible to add fungal control agents or fire control agents.

The particles of wood employed in step a) are preferably selected from finely divided wood, wood fibers, wood flakes, wood strands, wood wafers, wood shavings, hogged chips, wood particles. Particularly suitable for the process of the invention are wood shavings, wood fibers and wood strands. Wood particles for the purposes of the invention are those particles of wood that are employable for forming wood-base products.

The particles of wood which are employable in the process may be any products of comminuting ligno-cellulose-containing materials. Any reference herein to "lignocellulose-containing material" is to be understood as meaning vegetable material containing lignocellulose. Lignocellulose within the meaning of the present invention contains cellulose and/or hemicellulose as well as lignin.

"Cellulose" is an unbranched polysaccharide consisting of several hundred to ten thousand units of cellobiose. These units of cellobiose in turn consist of two molecules of glucose, which are linked to each other via a β-1,4-glycosidic bond.

"Hemicellulose" is a collective term for various constituent parts of cell walls in plants. Hemicelluloses are branched polysaccharides having a comparatively short chain length—typically of fewer than 500 sugar units—which are constructed from various sugar monomers. Hemicellulose is constructed essentially from various sugar monomers, for example glucose, xylose, arabinose, galactose and mannose, while the sugars may have acetyl- and also methyl-substituted groups. They have a random, amorphous structure and are readily hydrolyzable. Xylose and arabinose consist predominantly of sugar monomers having five carbon atoms (pentoses). Mannose and galactose consist mainly of sugar monomers having six carbon atoms (hexoses).

"Lignins" are amorphous, irregularly branched aromatic macromolecules which occur in nature as a constituent part of cell walls and there engender the lignification of the cell. They are constructed of substituted phenylpropanol units, display a lipophilic character and are room temperature insoluble in neutral solvents, for example water. Precursor substances of lignin include, for example, p-coumaryl alcohol, coniferyl alcohol and sinapyl alcohol. The molar masses of lignin are typically between 10 000 and 20 000 g/mol.

In one embodiment, the lignocellulose-containing material contains or consists of particles of wood. In a further embodiment, the lignocellulose-containing material contains or consists of lignin-containing plants, plant parts and/or wastes.

Step b) of the process according to the invention comprises resinating the particles of wood with a binder. Any reference to "resinating" is to be understood as meaning the step of entirely or partially wetting with a composition that contains a binder. Compositions of this type are specifically also referred to as "resin liquor" or "paste" by a person skilled in the art. Resinating may also be understood as referring particularly to the step of uniformly disbursing the binder-containing composition over the particles of wood. The step of applying the binder-containing composition may be effected, for example, by impregnating or spraying, in particular in a blowline. The step of resinating may alternatively or additionally be effected in a resinating drum. The step of resinating may more particularly be effected by jetting, for example via a two-product nozzle.

The amount of binder employed in the resinating step (step b) is preferably from 0.1 to 20 wt %, more preferably from 1 to 16 wt % and yet more preferably from 4 to 14 wt %, all based on the dry weight of wood (resin solids/absolutely dry). There are many applications where it will be found particularly apt for commercial practice to employ the binder in an amount of 0.1 to 15 wt %, both based on the dry weight of wood (resin solids/absolutely dry).

Binders for forming wood-base products within the meaning of the present invention may have one or more constituent parts. In one embodiment of the invention, the binder contains or consists of an aminoplastic binder. In another embodiment, the binder contains or consists of an isocyanate. In a further embodiment, the binder contains or consists of polymeric diphenylmethane diisocyanate (PMDI). The polymeric diphenylmethane diisocyanate (PMDI) may more particularly be present in an amount of 0.05 to 50 wt %, preferably of 0.1 to 25 wt % and more preferably of 1 to 10 wt %, all based on the total weight of the binder.

In principle, the process according to the invention or any one of the embodiments of said process is suitable for a multiplicity of combinations between the type of binder and the type of wood particle. At least one aminoplast resin is employable as binder. Aminoplastic binder and/or aminoplast resins will be found particularly advantageous in the commercial practice of wood-base manufacture. A mixture of various aminoplast resins is usable as well as a single aminoplast resin. Aminoplast resins are known to a person skilled in the art and they are described, for example, in "Ullmanns Enzyklopädie der technischen Chemie", 4th edition, volume 7, pp. 403 ff. Any reference here or elsewhere to aminoplast resins is to be understood as also meaning aminoplastic binder or aminoplast resin compositions. Aminoplast resins and/or aminoplast resin compositions may also contain water.

Aminoplast resins are obtained by condensing an amino-, imino- or amido-containing component with a carbonyl compound. Frequent starting materials for aminoplast resins include, for example, urea and/or melamine (as amino-containing component) and fomaldehyde (as carbonyl compound). In the latter case, the amino-containing component is usually precondensed with the carbonyl compound to a certain degree in a first step. This, depending on whether for example just melamine or just urea is used as amino-containing component in the first step, gives a so-called melamine resin or a urea resin. Melamine and/or urea resins of this type may form particularly the main constituent parts of aminoplast resins. In a second step, often also referred to as curing, the aminoplast resin may then be fully cross-linked. Resins formed from urea and formaldehyde are also referred to as urea-formaldehyde resins. Resins formed from melamine and formaldehyde are known as melamine-formaldehyde resin. Examples of aminoplast resins are urea-formaldehyde resins (UF), melamine-reinforced urea-formaldehyde resins (MUF), melamine-urea-phenol-formaldehyde resins (MUPF) or mixtures thereof.

Further customary binders for forming wood-base products within the meaning of the invention contain or consist of synthetic resins, in particular phenoplasts, vinyl acetates, isocyanates, epoxy resins and/or acrylic resins. Synthetic resins are in principle known to a person skilled in the art. Synthetic resins are described for example in Römpps Chemie-Lexikon, 7th edition, Frankh'sche Verlagshandlung Stuttgart, 1973, page 1893.

In the process of the present invention, the particles of wood and/or the binder are brought into contact with the broken dispersion of the invention before, during or after step b). The step of bringing the broken dispersion into contact with the particles of wood and/or the binder may be effected by entire or partial wetting. The step of bringing into contact with the broken dispersion may also take the form of uniformly disbursing the broken dispersion over the particles of wood and/or the binder. The step of bringing into contact with the broken dispersion may more particularly be effected by impregnating or spraying, in particular in a blowline.

In one embodiment, spraying is effected through a nozzle, nozzle systems or combinations thereof. The broken dispersion and/or the binder may be sprayed simultaneously or in succession, in particular through spatially and/or temporally consecutive nozzles. In effect, the binder may be applied by spraying before the broken dispersion or the broken dispersion may be applied by spraying before the binder. In a preferred embodiment, the particles of wood are first resinated and then brought into contact with the broken dispersion.

In commercial practice, it will be found to be advantageous with respect to the stability of the broken dispersion if the broken dispersion is not mixed until shortly before its application and/or bringing into contact with the binder and the particles of wood. In one embodiment, the step of mixing the wax-containing dispersion and the demulsifier for forming the broken dispersion is effected immediately before the step of bringing into contact with the particles of wood and/or with the binder, in which connection "immediately before" defines a period of less than 5 minutes, preferably of less than 1 minute and more preferably of less than 10 seconds before the step of bringing into contact.

The step of contacting, i.e., mixing, the wax-containing dispersion with the demulsifier may be effected in various modes. Any reference here or elsewhere to "mixing" is to be understood as meaning the step of completely or partially contacting the wax-containing dispersion with the demulsifier.

In one embodiment, the step of mixing the wax-containing dispersion and the demulsifier to form the broken dispersion is effected in a separate operation prior to the step of admixing to the particles of wood and/or the binder. The step of mixing in a separate operation may be effected, for example, in a mixing apparatus, in particular a static mixer.

In another embodiment, the step of mixing the wax-containing dispersion and the demulsifier to form the broken dispersion is effected by simultaneously admixing the wax-containing dispersion and the demulsifier to the particles of wood and/or the binder. This means that the demulsifier and the wax-containing dispersion are simultaneously supplied/fed and brought into contact with each other in a partial or complete manner, forming the broken dispersion completely or partially, and then bringing this completely or partially broken dispersion into contact with the particles of wood and/or with the binder. This simultaneous supplying/feeding is effected in particular through individual nozzles or two-nozzle systems. The reference to "simultaneously" is to be understood as also meaning a temporally and/or spatially consecutive admixture of the wax-containing dispersion and of the demulsifier in a way where the wax-containing dispersion and the demulsifier are brought into contact with each other at least partially before the at least partial mixture of wax-containing dispersion and demulsifier comes into contact with the particles of wood and/or with the binder.

In one embodiment of the process according to the invention, the concentration of the broken paraffin dispersion employed is less than 4 wt %, less than 3 wt % or less than 1 or 2 wt % (all as solids/absolutely dry), all based on the total weight of the lignocellulose-containing material (as of the particles of wood for example).

Step c) of the process according to the invention comprises compressing the glued particles of wood into a wood-base product. A person skilled in the art has in-principle knowledge of various methods to form particle-type wood-base products by pressing or compression molding. Step c) preferably comprises a step of hot pressing. Optimum results are obtainable when the press factor in the step of hot pressing is in the range from 2 to 10 s/mm, preferably from 3 to 6 s/mm. Press factor is here to be understood as meaning particularly the residence time in the press of the lignocellulosic particle-type wood-base product in seconds per millimeter of thickness of the ready-pressed lignocellulosic particle-type wood-base product.

Suitable temperatures for the pressing in step c) of the process according to the invention or one of the embodiments of said process are temperatures of 150° C. to 250° C., preferably of 160° C. to 240° C. and more preferably of 180° C. to 230° C. The process is particularly economical to carry out at temperatures in these ranges.

It will be found advantageous, for economic and technical reasons, to practice the pressing step by using a specific molding pressure (active pressure on the board/platen surface) of 50 to 300 N/cm². Pressures of this kind ensure particularly good adherence of the lignocellulosic particles to each other. In addition, such a molding pressure is capable of providing high strength to the lignocellulosic particle-type wood-base products.

The invention also relates to the use of the broken dispersion according to the invention for hydrophobicizing lignocellulose-containing material. The invention further relates to the use of any one of the above-described embodiments of the broken dispersion according to the invention for hydrophobicizing lignocellulose-containing material.

The invention further provides for the use of a polyfunctional compound as demulsifier for breaking a wax-containing dispersion containing the following components:
i) at least one aqueous phase as continuous phase,
ii) at least one disperse phase containing wax, and
iii) at least one emulsifier.

The above elucidations regarding these terms apply. In one embodiment, a polyisocyanate, in particular polymeric diphenylmethane diisocyanate (PMDI), is usable as demulsifier for breaking a wax-containing dispersion.

The invention further provides a two-component system as a kit-of-parts. This two-component system provided by the invention contains at least two components A and B:
A) a wax-containing dispersion containing
  i) at least one aqueous phase as continuous phase,
  ii) at least one disperse phase containing wax, and
  iii) at least one emulsifier,
B) a demulsifier for breaking the wax-containing dispersion.

The above remarks apply to components A and/or B of the two-component system. The components are present in the subject two-component system of the present invention such that they are not in contact with each other. Bringing these components A and B into contact with each other is a way to obtain a broken dispersion within the meaning of the invention.

The two-component system within the meaning of the invention has components A and B spatially separate from each other. In one embodiment, components A and B are present in respective different separate receptacles. In another embodiment, the components are present in a conjoint receptacle although the components A and B are kept spatially apart from each other within this receptacle. Only once the broken dispersion is to be obtained and/or provided, the components A and B are brought into contact with each other. This has been found to be particularly advantageous and relevant to commercial practice, since in this way the shelf stability of the wax-containing emulsion is exploitable for the emulsifier present therein. The properties of an emulsifier which are often disruptive in the final wood-base product because they mediate the uptake of water are very substantially neutralizable by admixing the demulsifier, contributing in turn to improving the swell properties of the wood-base product and/or of the lignocellulose-containing material present therein. The two-component system further enables the metering and/or dosage of the wax-containing dispersion A) and of the demulsifier B) to be adapted to the particular manufacturing conditions.

Particular embodiments of the invention will now be more particularly described by way of example with reference to Figures.

FIG. 1 shows a dispersion in a receptacle (1). A disperse phase (3) forms a heterodispersion in the continuous phase (2).

FIG. 2 shows a multiple dispersion in a receptacle (1). A multiple dispersion has a further disperse phase (4) present in the disperse phase (3), which is surrounded by the continuous phase (2). In effect, the disperse phase (3) is the continuous phase for disperse phase (4).

FIG. 3a shows a broken dispersion in a receptacle (1), containing a continuous phase (2) and a liquid disperse phase (3). The disperse phase (3) has to some extent coalesced into larger particles and/or a plurality of particles of the disperse phase are massed together. The broken dispersion shown is obtainable by adding a demulsifier of the invention to the dispersion of FIG. 1.

FIG. 3b shows a broken multiple dispersion in a receptacle (1), containing a continuous phase (2) and a liquid disperse phase (3). The disperse phase (3) has to some extent coalesced into larger particles and/or a plurality of particles of the disperse phase have massed together. A further dispersion phase (4) has been dispersed into the disperse phase (3). In effect, the disperse phase (3) is the continuous phase for disperse phase (4). The broken dispersion shown is obtainable by adding a demulsifier of the invention to the dispersion of FIG. 2.

FIG. 3c shows a broken dispersion in a receptacle (1), containing a continuous phase (2) and a liquid disperse phase (3). The disperse phase (3) has to some extent coalesced into larger particles and/or a plurality of particles of the disperse phase have massed together. Some of the disperse phase (3) has separated off above the continuous phase (2). The broken dispersion shown is obtainable by adding a demulsifier of the invention to the dispersion of FIG. 1.

FIG. 3d shows a broken dispersion in a receptacle (1), which contains a liquid continuous phase (2) and a liquid disperse phase (3). Some phase separation has taken place. The disperse phase (3) has to some extent coalesced into larger particles. Some of the disperse phase (3) has separated off above the continuous phase (2). The broken dispersion shown is obtainable by adding a demulsifier of the invention to the dispersion of FIG. 1.

FIG. 4 shows a further broken dispersion. Complete phase separation has taken place into the aqueous phase (2) and the wax-containing phase (3). The broken dispersion shown is obtainable by adding a demulsifier of the invention to the dispersion of FIG. 1.

FIG. 5 shows an embodiment of the step of resinating and of the step of spraying the broken dispersion (10) onto lignocellulose-containing material (5) in a resinating apparatus (6). From the nozzles (7) the binder (7') is sprayed onto the lignocellulose-containing material (5). Thereafter a nozzle (8) and a further nozzle (9) are used to spray the wax-containing dispersion (8') and the demulsifier (9') such that the wax-containing dispersion (8') and the demulsifier (9') are brought into contact to form the broken dispersion (10). This broken dispersion (10) then comes into contact with the resinated lignocellulose-containing material (5). The wax-containing dispersion (8') and the demulsifier (9') are admixable via separate nozzles (8, 9), via a conjoint nozzle (particularly as a ready-prepared mixture) and also via a two-product nozzle. Other orders for applying the binder (7'), the wax-containing dispersion (8') and the demulsifier (9') are likewise possible.

WORKING EXAMPLES

Figure 1:
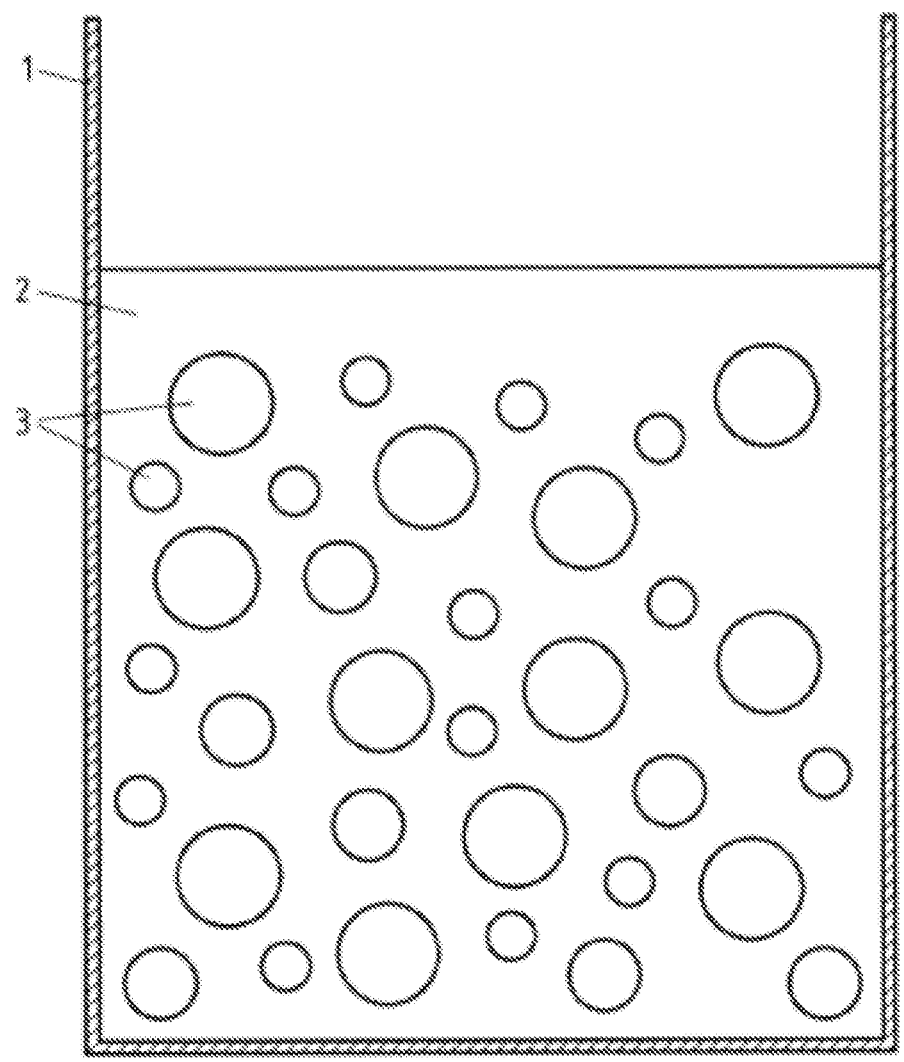
Figure 2:
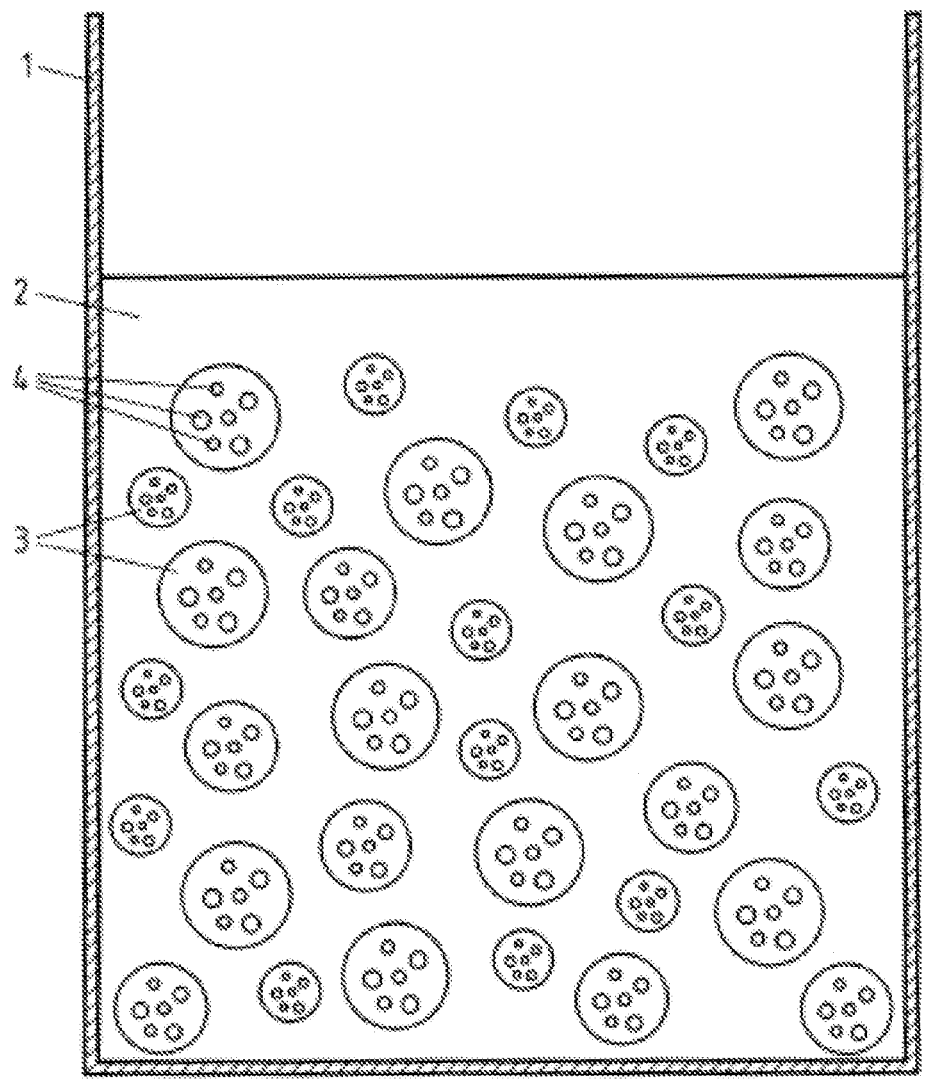
Figure 3A:
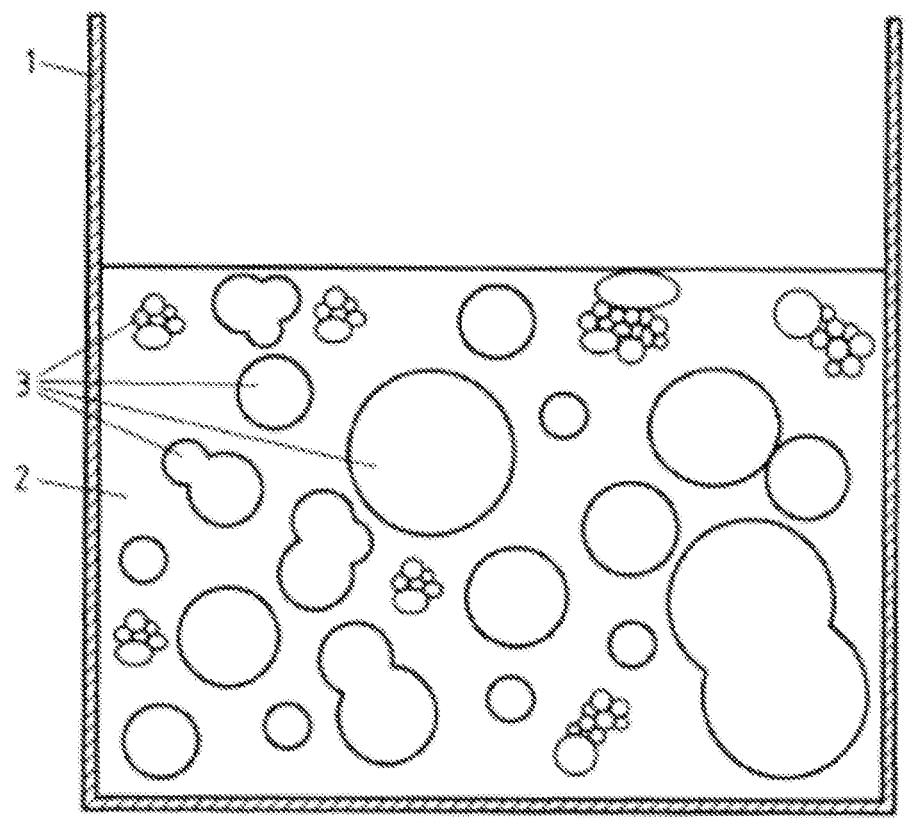
Figure 3B:
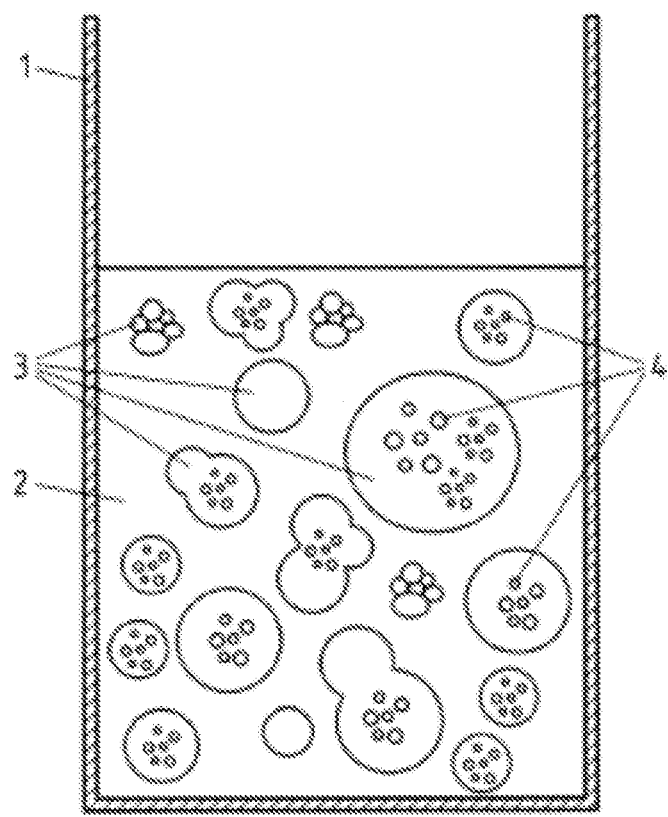
Figure 3C:
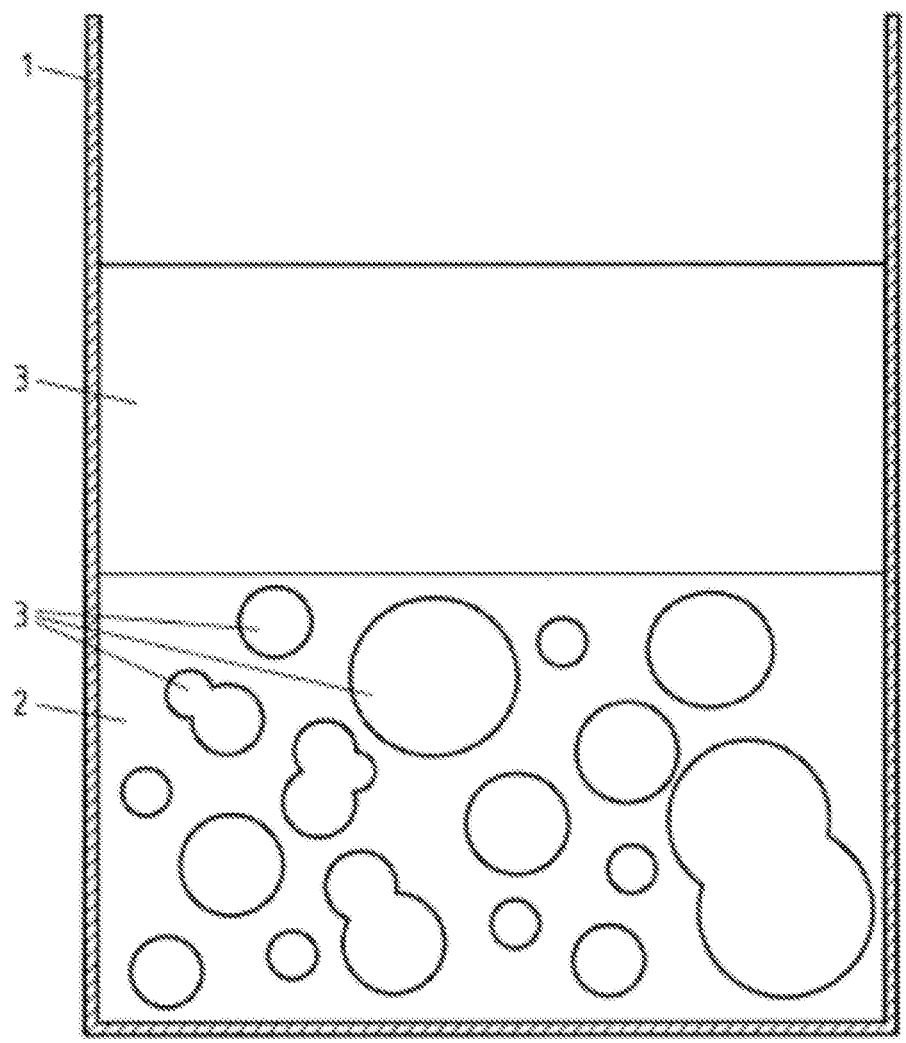
Figure 3D:
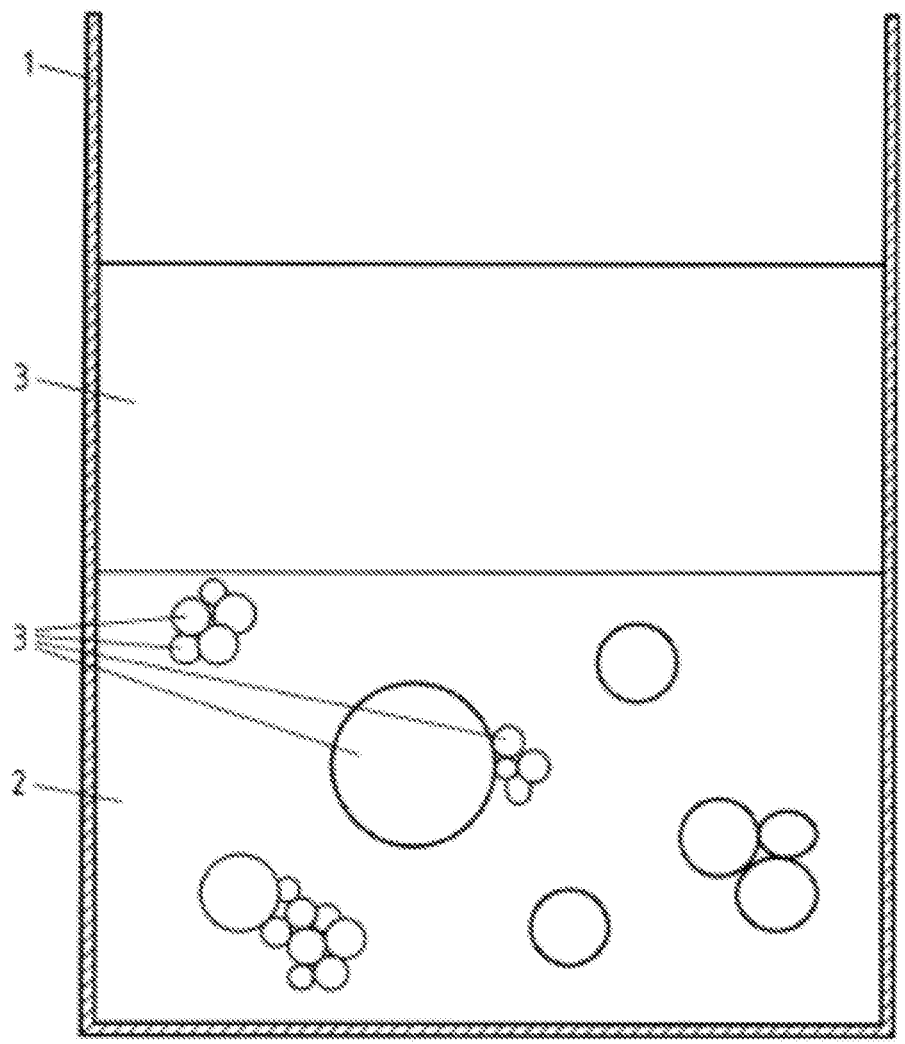
Figure 4:
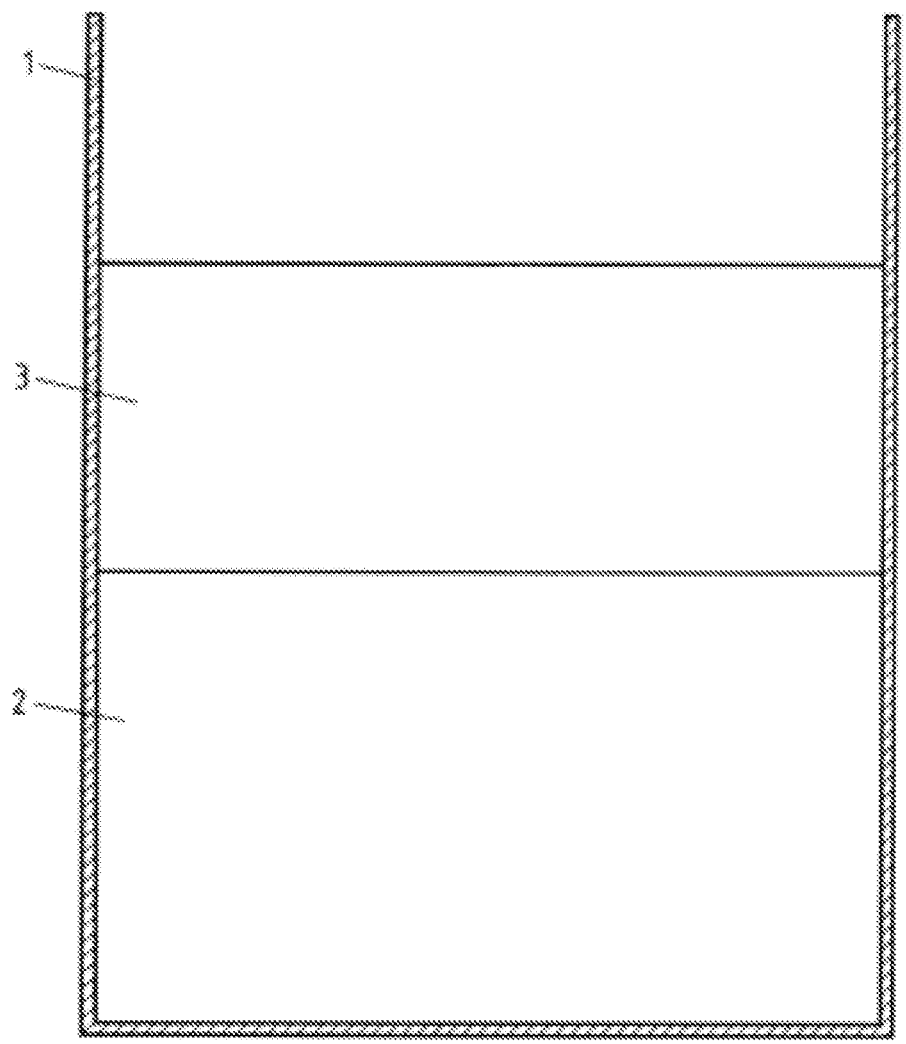
Figure 5:
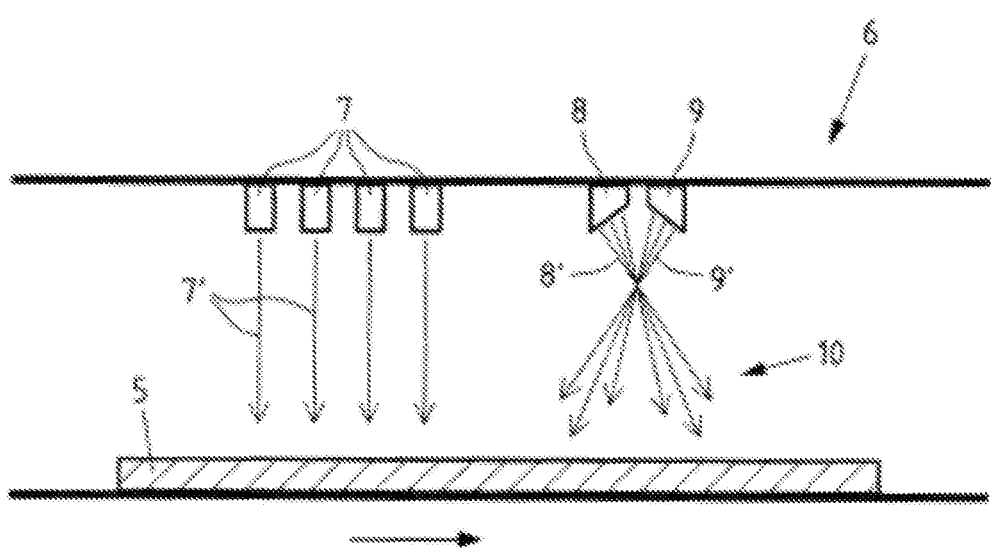
Figure 6:
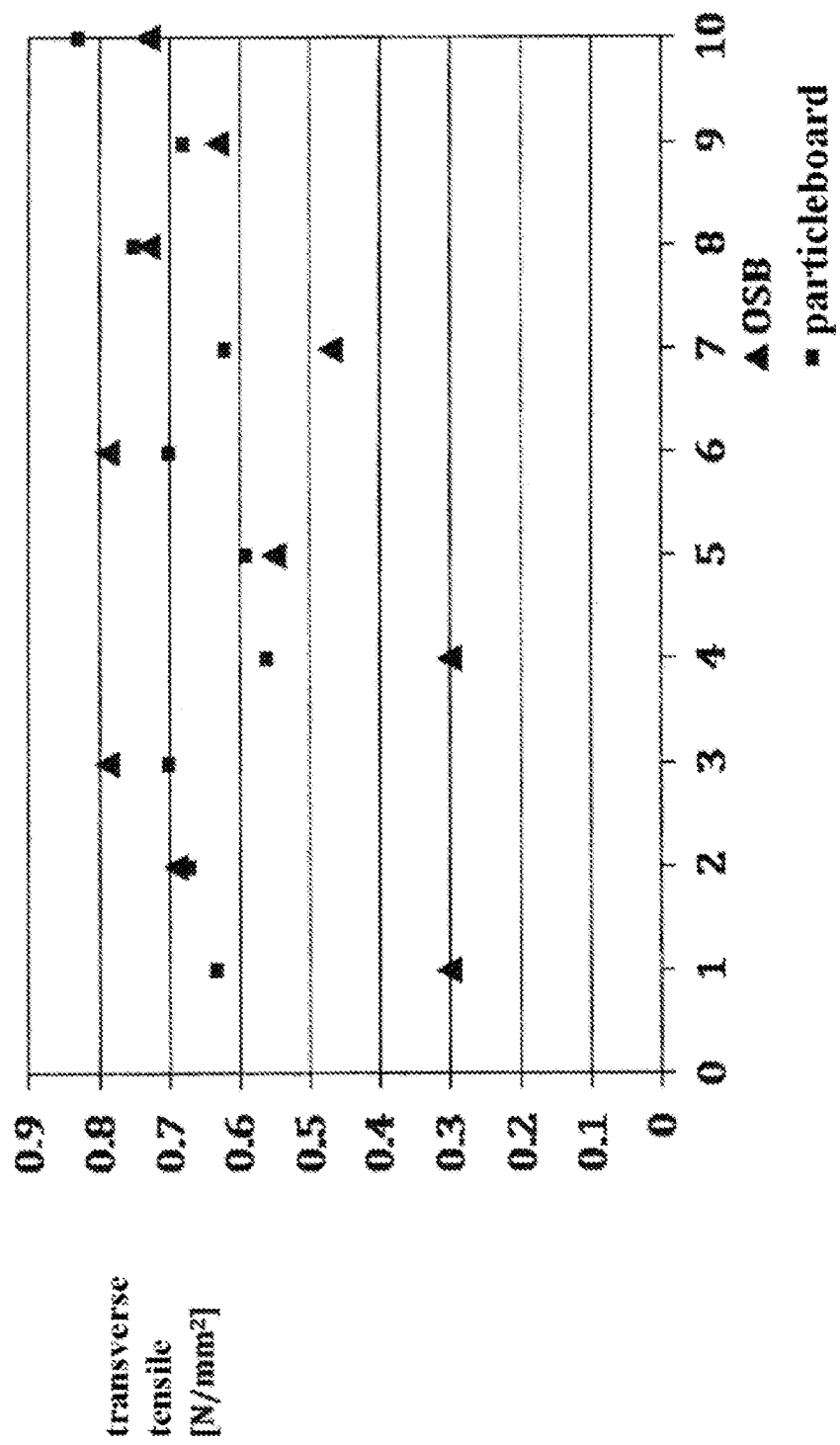
FIG. 6 shows a plot of the results of tests to determine the transverse tensile strength of OSB and particleboard panels obtained as per the working examples.
Figure 7:
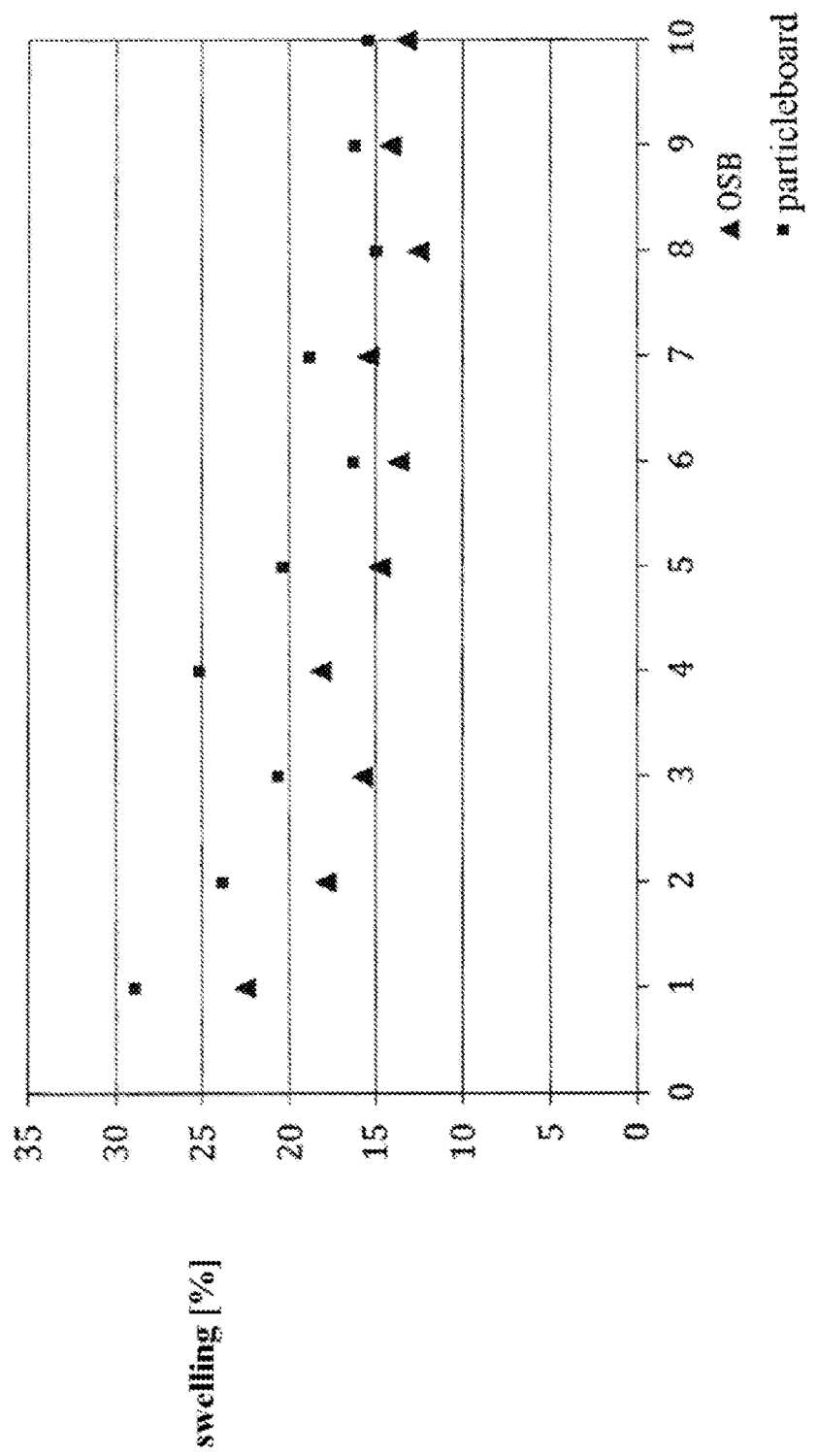
FIG. 7 shows a plot of the results of tests to determine the swelling of OSB and particleboard panels obtained as per the working examples.
Figure 8:
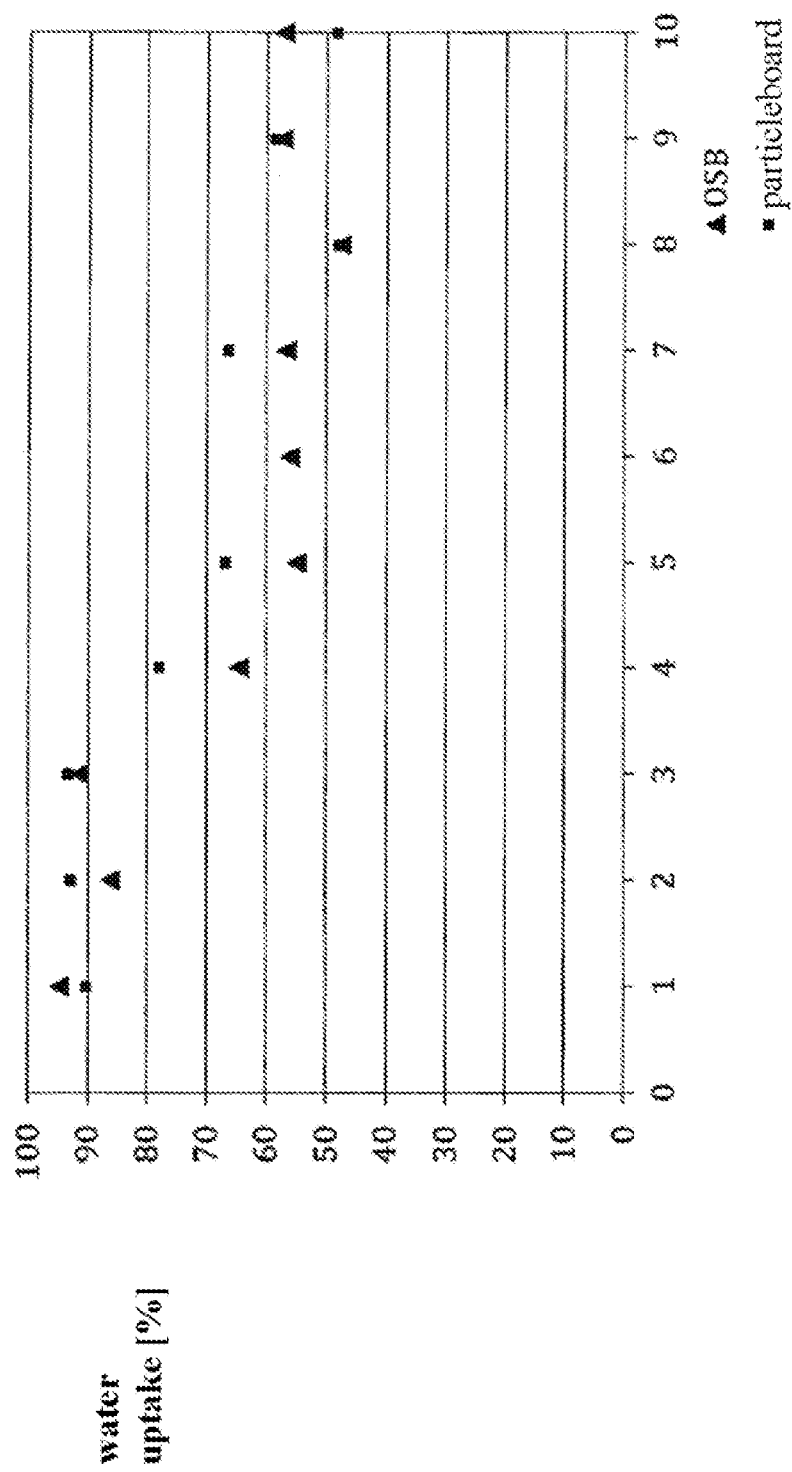
FIG. 8 shows a plot of the results for the water uptake of OSB and particleboard panels obtained as per the working examples.

Experimental Procedure:

The compositions listed in table 1 were used to produce in each case two OSB and two particleboard panels. Hydrophobicization was effected using a commercially available paraffin wax emulsion (Bomul 50 SYN wax emulsion from: BOMUL Producer, Supplier and Commercial Ltd. Nyírbogdány, Hungary, Gyártelep). A UF glue, a hardener, PMDI as demulsifier and the wax-containing dispersion were employed as follows:

TABLE 1

Compositions of panels, FH = solid resin, PMDI = diphenylmethane diisocyanate, t = metric tons, atro = absolutely dry, based on the wood fraction

| Example | UF glue [% FH/t atro] | Hardener [% solids/ FH] | PMDI [% FH/t atro] | Wax-containing dispersion [solids/atro] |
| --- | --- | --- | --- | --- |
| 1 (reference) | 7% | 3% | none | none |
| 2 (reference) | 7% | 3% | 0.25% | none |
| 3 (reference) | 7% | 3% | 0.5% | none |
| 4 (reference) | 7% | 3% | none | 1% |
| 5 | 7% | 3% | 0.25% | 1% |
| 6 | 7% | 3% | 0.5% | 1% |
| 7 | 7% | 3% | 0.25% | 1% |
| 8 | 7% | 3% | 0.5% | 1% |
| 9 | 7% | 3% | 0.25% | 1% |
| 10 | 7% | 3% | 0.5% | 1% |

The OSB and/or particleboard panels having the compositions shown in table 1 were produced as follows:

To produce the particleboard and/or OSB panels, first the particle and/or strand material needed was introduced into the plowshare mixer. Resination or additive admixture is effected via a two-product nozzle.

The panels were all produced on the laboratory scale using the same level of resination moisture.

The water needed was added first with all panels.

In the case of reference panel 1, the UF glue was mixed with the hardener and admixed via the nozzle.

In the case of reference panels 2 and 3, the UF-hardener mixture was supplemented with the stated amounts of PMDI.

In the case of reference panel 4, first the UF-hardener mixture was prepared and admixed and then the wax-containing dispersion. In this way a "conventionally" hydrophobicized wood-base product was obtained.

In the case of panels 5 and 6, again the UF glue was mixed with the hardener and the PMDI and added to the particles/strands first before the wax-containing dispersion was added.

In the case of panels 7 and 8, the PMDI was mixed into an emulsion. In the actual process, the UF-hardener mixture was again admixed before the wax-containing dispersion with the PMDI was admixed.

To produce panels 9 and 10, the PMDI quantity was split as between the UF glue and the emulsion, and again the UF-hardener-PMDI mixture was admixed before the emulsion-PMDI mixture.

The pressing step was carried out using a molding pressure of max. 150 bar, a press factor of 9.3 seconds/mm and a total press time of 160 seconds to produce panels having a thickness of 14 mm and a target density of 600 kg/m$^3$. They were subsequently measured for transverse tensile strength, swelling and water uptake as follows:

The transverse tensile strength of the OSB and particleboard panels obtained was determined as described in EN 319 (for up to 10 kN) using a Zwick-Roell Zmart.Pro. Swelling and water uptake were measured after the samples had been left to age in the swell tank for 24 hours.

The results are shown in diagrams 1 to 3 and tables 2 and 3. Every datapoint represents the mean of the results for the duplicate panels produced per board type.

TABLE 2

Transverse tensile strength, water uptake and swelling of OSB panels

| | OSB | | |
|---|---|---|---|
| Panel | Transverse tensile [N/mm$^2$] | Swelling [%] | Water uptake [%] |
| 1 | 0.3 | 22.5 | 94.7 |
| 2 | 0.69 | 17.9 | 86.1 |
| 3 | 0.79 | 15.7 | 91.4 |
| 4 | 0.3 | 18.1 | 64.4 |
| 5 | 0.55 | 14.7 | 55.1 |
| 6 | 0.79 | 13.7 | 56.1 |
| 7 | 0.47 | 15.4 | 56.8 |
| 8 | 0.73 | 12.5 | 47.5 |
| 9 | 0.63 | 14.2 | 57.4 |
| 10 | 0.73 | 13.3 | 57.2 |

TABLE 3

Transverse tensile strength, water uptake and swelling of particleboard panels

| | Particleboard | | |
|---|---|---|---|
| Panel | Transverse tensile [N/mm$^2$] | Swelling [%] | Water uptake [%] |
| 1 | 0.63 | 28.8 | 90.1 |
| 2 | 0.67 | 23.8 | 92.8 |
| 3 | 0.7 | 20.6 | 93.1 |
| 4 | 0.56 | 25.1 | 77.8 |
| 5 | 0.59 | 20.3 | 66.7 |
| 6 | 0.7 | 16.2 | 55.4 |
| 7 | 0.62 | 18.8 | 66.2 |
| 8 | 0.75 | 14.9 | 47.7 |
| 9 | 0.68 | 16.1 | 58.6 |
| 10 | 0.83 | 15.4 | 48.2 |

Results:

As compared with the wood panels of Example 1 (reference panels), which did not contain any wax-containing dispersion or PMDI, the tests showed that with both types of board the sole admixture of wax-containing dispersion (Example 4) caused a distinct degradation of transverse tensile strength, but a reduction in swelling and water uptake.

The sole admixture of PMDI (Examples 2 and 3), by contrast, led versus Example 1 to an improvement in transverse tensile strength and a slight reduction in swelling coupled with a largely unchanged water uptake.

The treatment with a mixture of wax-containing dispersion and PMDI in the manner of the present invention (Examples 5 to 10) led versus the panels of Example 1 to a distinct improvement in transverse tensile strength and reduction in swelling and also in water uptake. Both the types of panel in Examples 5 to 10 also showed lower swelling and water uptake versus Examples 2, 3 and 4.

Regarding transverse tensile strength, a PMDI amount of 0.5% (Examples 6, 8, 10) led to an increase in transverse tensile strength versus the admixture of 0.25% of PMDI (Examples 5, 7, 9) or no PMDI (Examples 1 and 4).

Regarding the swell properties and the water uptake, both the panel types of Examples 5, 7 and 9 and also of Examples 6, 8 and 10 showed similar results. Overall, the result was lower swelling for OSB.

Therefore, overall, a distinct improvement in swell properties was found for the treatment of the wood material with a broken dispersion (obtained by mixing a wax-containing dispersion and PMDI) versus the wood panels of Comparative Examples 1 to 4. Overall, therefore, the hydrophobicized wood-base product obtained has better swelling properties than "conventionally" hydrophobicized wood-base products (cf. Examples 2 and 3).

The invention concepts reproduced in the following sentences 1 to 17 also form part of the subject-matter of this application:

1. Broken dispersion for hydrophobicizing lignocellulose-containing material, wherein the broken dispersion is obtainable by mixing at least mixed
   A) a wax-containing dispersion containing the following components:
      i) at least one aqueous phase as continuous phase,
      ii) at least one disperse phase containing wax, and
      iii) at least one emulsifier,
      with
   B) a demulsifier having at least one functional group.
2. Broken dispersion according to Sentence 1, characterized in that the broken dispersion contains a reaction product formed from the demulsifier and a constituent of the wax-containing dispersion A), in particular a reaction product formed from demulsifier and emulsifier.
3. Broken dispersion according to Sentence 1 or 2, characterized in that the demulsifier is a polyfunctional compound.
4. Broken dispersion according to Sentence 3, characterized in that the polyfunctional compound is a polyisocyanate, in particular a polymeric polyisocyanate.
5. Broken dispersion according to Sentence 4, characterized in that the polyisocyanate is a polymeric diphenylmethane diisocyanate.
6. Broken dispersion according to any of the preceding Sentences 1-5, characterized in that the wax is selected from natural waxes and/or paraffin, wherein the paraffin is particularly selected from $C_{10}$ to $C_{50}$ alkanes and paraffin wax, and wherein the paraffin wax may be particularly selected from the group consisting of petroleum-based paraffin waxes, soft waxes, Fischer-Tropsch paraffins and also mixtures and refinery products thereof.
7. Broken dispersion according to any of the preceding Sentences 1-6, characterized in that the dry matter content of the wax-containing dispersion is from 10 to 90 wt %, preferably from 20 to 80 wt % and more preferably from 30 to 70 wt %, all based on the total weight of the wax-containing dispersion.
8. Broken dispersion according to any of the preceding Sentences 1-7, characterized in that the wax-containing dispersion contains
   10 to 95%, preferably 15 to 90 wt % of $C_{10}$ to $C_{50}$ alkanes and/or
   1 to 70%, preferably 2 to 60 wt % of fatty acids,
   all based on the total amount of dry matter in the wax-containing dispersion.
9. Broken dispersion according to any of the preceding Sentences 1-8, characterized in that the amount of demulsifier is from 0.05 to 1 wt % (solids/solids), preferably from 0.08 to 0.8 wt % (solids/solids) and more preferably from 0.1 to 0.5 wt % (solids/solids), all based on the total solids weight of the broken dispersion.
10. Process for forming a wood-base product comprising the steps of
    a) providing particles of wood,
    b) resinating the particles of wood with a binder, c) compressing the resinated particles of wood to form a wood-base product, characterized in that before, during or after step b) the particles of wood and/or the binder are brought into contact with a broken dispersion according to any of the preceding Sentences 1-7.

11. Process according to Sentence 10, characterized in that the broken dispersion is employed in an amount of 0.1 to 10 wt % (solids/absolutely dry), preferably of 0.3 to 5 wt % (solids/absolutely dry) and more preferably of 0.5 to 2.5 wt % (solids/absolutely dry), all based on the total weight of the particles of wood (absolutely dry).

12. Process according to either of Sentences 10 and 11, characterized in that the step of mixing the wax-containing dispersion and the demulsifier to form the broken dispersion is effected immediately before the step of bringing into contact with the particles of wood and/or with the binder, in which connection "immediately before" defines a period of less than 5 minutes, preferably of less than 1 minute and more preferably of less than 10 seconds before the step of bringing into contact.

13. Process according to any of Sentences 10 to 12, characterized in that the step of mixing the wax-containing dispersion and the demulsifier to form the broken dispersion is effected
in a separate operation prior to the step of admixing to the particles of wood and/or the binder, or
by simultaneously admixing the wax-containing dispersion and the demulsifier to the particles of wood and/or the binder.

14. Process according to any of Sentences 10 to 13, characterized in that the particles of wood are selected from wood shavings, wood fibers and wood strands.

15. Process according to any of Sentences 10 to 14, characterized in that the binder is an aminoplastic binder.

16. Wood-base product obtainable by a process according to any of Sentences 10 to 15.

17. Use of a broken dispersion according to any of Sentences 1 to 9 for hydrophobicizing a lignocellulose-containing material and/or a binder.

The invention claimed is:

1. Process for forming a wood-base product comprising the steps of
   a) providing particles of wood,
   b) resinating the particles of wood with a binder, wherein said binder is not a polyisocyanate,
   c) compressing the resinated particles of wood to form a wood-base product, characterized in that before, during or after step b) the particles of wood and/or the binder are brought into contact with a broken dispersion for hydrophobicizing lignocellulose-containing material, wherein the broken dispersion is obtained by mixing at least
A) a wax-containing dispersion containing the following components:
   i) at least one aqueous phase as a continuous phase,
   ii) at least one disperse phase containing wax, and
   iii) at least one emulsifier,
with
B) a demulsifier having at least one functional group,
   wherein the amount of demulsifier is from 0.05 to 1 weight % (solids/solids) based on the total solids weight of the broken dispersion.

2. Process according to claim 1, wherein the broken dispersion contains a reaction product formed from the demulsifier and a constituent of the wax-containing dispersion A.

3. Process according to claim 1, wherein the demulsifier is a polyfunctional compound.

4. Process according to claim 3, wherein the polyfunctional compound is a polyisocyanate.

5. Process according to claim 4, wherein the polyisocyanate is a polymeric diphenylmethane diisocyanate.

6. Process according to claim 1, wherein the wax is selected from natural waxes and/or paraffin, wherein the paraffin is selected from $C_{10}$ to $C_{50}$ alkanes and paraffin wax, and wherein the paraffin wax is selected from the group consisting of petroleum-based paraffin waxes, soft waxes, Fischer-Tropsch paraffins and also mixtures and refinery products thereof.

7. Process according claim 1, wherein the dry matter content of the wax-containing dispersion is from 10 to 90 weight % based on the total weight of the wax-containing dispersion.

8. Process according claim 1, wherein the wax-containing dispersion contains
   10 to 95 weight % of $C_{10}$ to $C_{50}$ alkanes and/or
   1 to 70 weight % of fatty acids,
all based on the total amount of dry matter in the wax-containing dispersion.

9. Process according to claim 1, wherein the broken dispersion is employed in an amount of 0.1 to 10 weight % (solids/absolutely dry) based on the total weight of the particles of wood (absolutely dry).

10. Process according to claim 1, wherein the step of mixing the wax-containing dispersion and the demulsifier to form the broken dispersion is effected immediately before the step of bringing into contact with the particles of wood and/or with the binder, whereby "immediately before" defines a period of less than 5 minutes before the step of bringing into contact.

11. Process according to claim 1, wherein the step of mixing the wax-containing dispersion and the demulsifier to form the broken dispersion is effected
   in a separate operation prior to admixing to the particles of wood and/or the binder, or
   by simultaneously admixing the wax-containing dispersion and the demulsifier to the particles of wood and/or the binder.

12. Process according to claim 1, wherein the particles of wood are selected from wood shavings, wood fibers and wood strands.

13. Process according to claim 1, wherein the binder is an aminoplastic binder.

* * * * *